US012355854B2

(12) United States Patent
Kapur et al.

(10) Patent No.: US 12,355,854 B2
(45) Date of Patent: *Jul. 8, 2025

(54) CONFIGURABLE AND DYNAMIC TRANSFORMATION OF WEB CONTENT

(71) Applicant: DRNC HOLDINGS, INC., Wilmington, DE (US)

(72) Inventors: Ajay Kapur, San Francisco, CA (US); Andrew Henry Farmer, San Francisco, CA (US); Ishan Anand, San Francisco, CA (US)

(73) Assignee: DRNC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,348

(22) Filed: Mar. 7, 2023

(65) Prior Publication Data

US 2023/0208939 A1 Jun. 29, 2023

Related U.S. Application Data

(63) Continuation of application No. 17/409,529, filed on Aug. 23, 2021, now Pat. No. 11,677,857, which is a (Continued)

(51) Int. Cl.
H04L 67/60 (2022.01)
G06F 16/904 (2019.01)
H04L 67/02 (2022.01)

(52) U.S. Cl.
CPC ............ *H04L 67/60* (2022.05); *G06F 16/904* (2019.01); *H04L 67/02* (2013.01)

(58) Field of Classification Search
None
See application file for complete search history.

(56) References Cited

U.S. PATENT DOCUMENTS 5,835,718 A 11/1998 Blewett
6,128,655 A 10/2000 Fields
(Continued)

FOREIGN PATENT DOCUMENTS

WO 2010041029 A1 4/2010
WO 2010081160 A1 7/2010

OTHER PUBLICATIONS

Fan Peng Kong, Design of a Transcoding Proxy Server for Mobile Web Browsing, Graduate Department of Electrical and Computer Engineering, University of Toronto, copyright 2000, 130 pages.
(Continued)

*Primary Examiner* — Maikhanh Nguyen
(74) *Attorney, Agent, or Firm* — Richard LaPeruta

(57) ABSTRACT

In a system for dynamically transforming web content, an HTTP request is received from an Internet client. The web resource identified in the request is accessed. The content of the web resource is analyzed. Transformation instructions are applied on identified portions of the content of the web resource. Each applied transformation instruction includes logic to locate and manipulate an identified portion of the content, and at least one of the applied transformation instructions is a client-side script transformation instruction that modifies a client-side script included in the content, removes a client-side script included in the content, and/or adds a client-side script to the content. An HTTP response is rendered that includes the results of the applied transformation instructions and those portions of the content that were not manipulated by a transformation instruction. The response is then transmitted to the client.

16 Claims, 21 Drawing Sheets

Related U.S. Application Data continuation of application No. 12/911,689, filed on Oct. 25, 2010, now Pat. No. 11,102,325.

(60) Provisional application No. 61/279,596, filed on Oct. 23, 2009.

(56) References Cited

U.S. PATENT DOCUMENTS

| | | | |
|---|---|---|---|
| 6,393,605 B1 | 5/2002 | Loomans | |
| 6,415,313 B1 | 7/2002 | Yamada | |
| 6,493,733 B1* | 12/2002 | Pollack | G06F 16/958 |
| | | | 707/E17.116 |
| 6,549,908 B1 | 4/2003 | Loomans | |
| 6,584,498 B2 | 6/2003 | Nguyen | |
| 6,728,960 B1 | 4/2004 | Loomans | |
| 7,020,721 B1 | 3/2006 | Levenberg | |
| 7,020,845 B1 | 3/2006 | Gottfurcht | |
| 7,058,633 B1 | 6/2006 | Gnagy | |
| 7,069,497 B1* | 6/2006 | Desai | G06F 16/958 |
| | | | 715/255 |
| 7,099,873 B2 | 8/2006 | Agarwalla | |
| 7,373,500 B2 | 5/2008 | Ramelson | |
| 7,389,330 B2 | 6/2008 | Dillon | |
| 7,398,472 B2 | 7/2008 | Corrington | |
| 7,441,196 B2 | 10/2008 | Gottfurcht | |
| 7,512,715 B2 | 3/2009 | Marks | |
| 7,574,486 B1* | 8/2009 | Cheng | H04L 9/40 |
| | | | 709/236 |
| 7,634,562 B2* | 12/2009 | Litofsky | H04L 67/101 |
| | | | 709/224 |
| 7,707,223 B2 | 4/2010 | Zubenko | |
| 7,735,127 B1 | 6/2010 | Rive | |
| 7,895,261 B2 | 2/2011 | Jones | |
| 7,921,353 B1 | 4/2011 | Murray | |
| 7,925,694 B2* | 4/2011 | Harris | H04L 67/02 |
| | | | 709/227 |
| RE42,892 E | 11/2011 | Montulli | |
| 8,103,742 B1 | 1/2012 | Green | |
| 8,285,808 B1 | 10/2012 | Stephen | |
| 8,321,502 B2 | 11/2012 | Scoda | |
| 8,438,312 B2 | 5/2013 | Kapur | |
| 8,645,916 B2 | 2/2014 | Hanus | |
| 8,903,894 B2 | 12/2014 | Dillon | |
| 9,232,021 B2 | 1/2016 | Kapur | |
| 10,057,324 B2* | 8/2018 | Gero | H04L 67/568 |
| 11,102,325 B2 | 8/2021 | Kapur | |
| 2001/0049796 A1 | 12/2001 | Roth | |
| 2002/0138649 A1 | 9/2002 | Cartmell | |
| 2002/0199014 A1 | 12/2002 | Yang | |
| 2003/0088716 A1 | 5/2003 | Sanders | |
| 2003/0182357 A1 | 9/2003 | Chess | |
| 2004/0205149 A1 | 10/2004 | Dillon | |
| 2005/0022116 A1 | 1/2005 | Bowman | |
| 2005/0080870 A1 | 4/2005 | Marks | |
| 2006/0059462 A1* | 3/2006 | Yamamoto | G03G 15/5079 |
| | | | 707/E17.107 |
| 2006/0156389 A1 | 7/2006 | Brown | |
| 2008/0005664 A1* | 1/2008 | Chandra | G06F 16/986 |
| | | | 715/234 |
| 2008/0104224 A1* | 5/2008 | Litofsky | H04L 67/535 |
| | | | 709/224 |
| 2008/0222244 A1 | 9/2008 | Huang | |
| 2008/0288475 A1 | 11/2008 | Kim | |
| 2008/0288515 A1 | 11/2008 | Kim | |
| 2009/0013267 A1 | 1/2009 | Cudich | |
| 2009/0019105 A1 | 1/2009 | Sebastian | |
| 2009/0029687 A1 | 1/2009 | Ramer | |
| 2009/0252062 A1 | 10/2009 | Justen | |
| 2010/0146413 A1 | 6/2010 | Yu | |
| 2010/0199197 A1 | 8/2010 | Faletski | |
| 2011/0035442 A1 | 2/2011 | Hjelm | |
| 2011/0099294 A1 | 4/2011 | Kapur | |
| 2011/0099467 A1 | 4/2011 | Kapur | |
| 2013/0041946 A1 | 2/2013 | Joel | |
| 2013/0305045 A1* | 11/2013 | Potekhin | G06F 16/951 |
| | | | 713/165 |

OTHER PUBLICATIONS

McConnell, Building A Translation Proxy Server (How to Make Any Website Translatable). Oct. 2009. http://broadcast.oreilly.com/2009/10/building-a-translation-proxy-s-html.

No Author Listed, MobiForge—Mowser Adaption Steps. Feb. 15, 2009. http://web.archive.org/web/20090215190128/https://mobieforge.com/developing/page/mowser-adaption-steps, 3 pages.

Smith et al., "Transcoding Internet Content for Heterogeneous Client Devices," 1998 IEEE International Symposium on Circuits and Systems (ISCAS) vol. 3, pp. 599-602.

* cited by examiner

ORIGINAL
REQUEST
180
POST /activities/index.html HTTP/1.1
HOST HEADER
FIELD 310     Host: www.example.moovweb.com
Cookie: foo=bar show=movies&genre=action

FIG. 3

TRANSFO
RMED
REQUEST
182
POST /activities/index.html HTTP/1.1
HOST HEADER
FIELD 310     Host: www.example.com
Cookie: foo=bar show=movies&genre=action

FIG. 4

```
                                              RESPONSE 184
HTTP/1.1 200 OK
Date: Mon, 23 May 2005 22:38:34 GMT
Server: Apache/1.3.3.7 (Unix) (Red-Hat/Linux)
Last-Modified: Wed, 08 Jan 2003 23:11:55 GMT
Etag: "3f80f-1b6-3e1cb03b"
Accept-Ranges: bytes
Content-Length: 438
Connection: close                    COOKIE DOMAIN 620
Set-Cookie: foo=bar; path=/; domain=.example.com
Content-Type: text/html; charset=UTF-8

<html>
<head>
<script>
function buyTickets1(movieName) { SCRIPT 630
   window.location = "http://example.com/activities/buytickets/" +
   movieName;}         SCRIPT 640
function buyTickets2(movieName) {
   window.location = "buytickets/" + movieName;}
function getShowtimes(movieName) {   650
   var req = new XMLHttpRequest();
   req.open('GET', 'http://example.com/activities/showtimes/' +
   movieName', false);
   req.send(null);
   if(req.status == 200) {
   alert(req.responseText);}}
</script>
</head>
<body>       RELATIVE URL 670
<a href="batman">
   Batman     RELATIVE URL 660
   <img src="img/batman.png" />
</a>
<input value="Buy Batman Ticket" onclick="buyTickets1('Batman')" />
<input value="Showtimes" onclick="getShowtimes('Batman');" />
<br>                            ABSOLUTE URL 675
<a href="http://example.com/fantasticfour">
   Fantastic Four
   <img src="http://example.com/img/fantasticfour.png" />
</a>                                    ABSOLUTE URL 665
<input value="Buy Fantastic Four Ticket"
onclick="buyTickets2('FantasticFour')" />
<input value="Showtimes" onclick="getShowtimes('Fantastic Four');" />
</body>
<html>         FIG. 6
```

```
                            710
                           ↙
<script>
{
if (url == undefined) return;
var moovweb_host = "http://example.moovweb.com";
var new_url = url;
if (url.indexOf("http") == 0)
{ var matches = url.match(/(https?:\/\/)([^\/]+)(.*)/);
var scheme = matches[1];
var host = matches[2];
var path = matches[3];
new_url = scheme + host + "." + moovweb_host + path;
}
return new_url
} function moov_open_passthrough(method, url, some_boolean) {
var new_url = moov_passthrough_link(url);
this._open(method, new_url, some_boolean);
}
if (XMLHttpRequest)
{
// Browsers besides Internet Explorer
XMLHttpRequest.prototype._open = XMLHttpRequest.prototype.open;
XMLHttpRequest.prototype.open = moov_open_passthrough;
} else if (ActiveXObject)
{
// Internet Explorer
ActiveXObject.prototype._open = ActiveXObject.prototype.open;
ActiveXObject.prototype.open = moov_open_passthrough;
}
</script>
```

FIG. 7

```
                  Example.html
<html>
<head>
<link rel="stylesheet" href="http://ishan.org/example.css"
type="text/css" />
</head>
<body>
    <div class="alpha">
        <h1>First line</h1>
    </div>
    <div class="beta">
        <h1>Second line</h1>
    </div>
</body>
</html>
```

```
              Example.css
div {
    padding: 20px;
}
.alpha {
    background-color: green;
}
.beta {
    color: white;
    background-color: blue;
}
```

```
<html>
<head>
    <link rel="stylesheet" href="http://ishan.org/example.css" type="text/css" />
</head>
<body>
    <div class="alpha">
        <h1>First line</h1>
    </div>
    </body>
</html>
```

Example.html
(After the RemoveElements
Transformation Instruction)

```
<html>
<head>
    <link rel="stylesheet" href="http://ishan.org/example.css" type="text/css" />
</head>
<body>
    <div class="beta">
        <h1>Second line</h1>
    </div>
    <div class="alpha">
        <h1>First line</h1>
    </div>
</body>
</html>
```

Example.html
(After the MoveBefore
transformation instruction)

Example.html
(After the RemoveCSS
transformation instruction)

```
<html>
<head></head>
<body>
    <div class="alpha">
        <h1>First line</h1>
    </div>
    <div class="beta">
        <h1>Second line</h1>
    </div>
</body>
</html>
```

Example.html
(After an AddCSS
transformation instruction)

```
<html>
<head>
<link rel="stylesheet" type="text/css" href="http://ishan.org/
alternate_example.css"/> </head>
<body>
<div class="alpha">
<h1>First line</h1>
</div>
<div class="beta">
<h1>Second line</h1>
</div>
</body>
</html>
```

FIG. 21

Alternate_Example.css

```
div {
  padding: 0px;
}
.alpha {
  background-color: red;
  text-align: center;
}
.beta {
  color: white;
  background-color: black;
  text-align: right;
}
```

FIG. 20

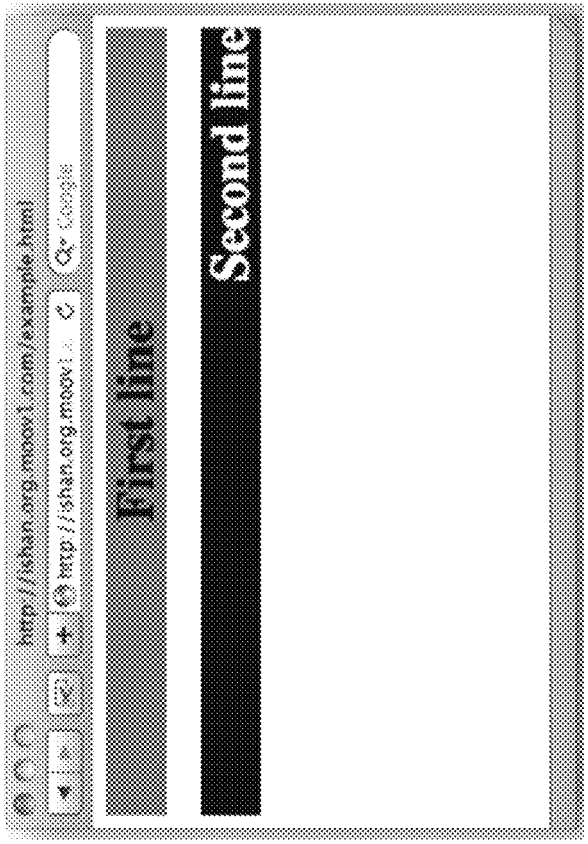

FIG. 22

Example.html (transformed due to InlineCSS transformation instruction

```
<html>
<head><style rel="stylesheet" type="text/css" from="http://
ishan.org/example.css">div {
padding: 20px;
}
.alpha {
    background-color: green;
} .beta {
    color: white;
    background-color: blue;
}</style></head>
<body>
    <div class="alpha">
        <h1>First line</h1>
    </div>
    <div class="beta">
        <h1>Second line</h1>
    </div>
</body> </html>
```

FIG. 23

FIG. 24

```
<head>
    <link rel="stylesheet" href="http://ishan.org/example.css" type="text/css" />
</head>
<body>
                        LINK-ELEMENT 2520
    <div class="alpha">
                          CONTENT-ELEMENT 2525
        <h1>First content</h1>
Imagine that there were a lot of content here. On a mobile device
it might be easier to navigate the page if you saw only the
heading for this content and not the content itself. You could
always see this content by tapping on the header.
    </div>
               LINK-ELEMENT 2530
    <div class="beta">
                          CONTENT-ELEMENT 2535
        <h1>Second content</h1>
Imagine that there were a lot of content here. On a mobile device
it might be easier to navigate the page if you saw only the
heading for this content and not the content itself. You could
always see this content by tapping on the header.
    </div>
</body></html>
```

FIG. 25

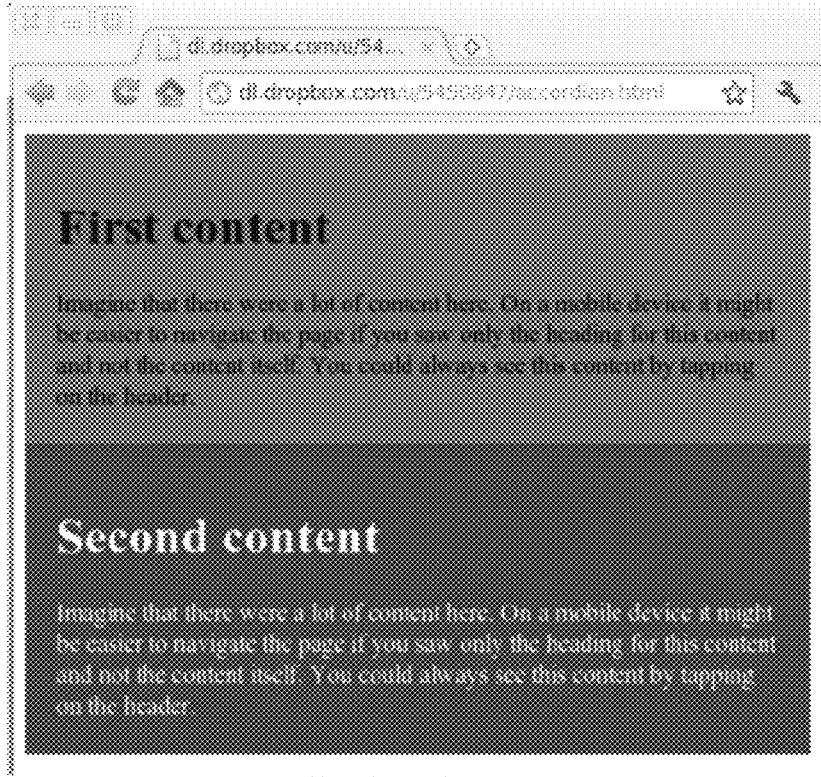

FIG. 26

```
<html>
<head>
<link rel="stylesheet" href="http://ishan.org/example.css"
type="text/css">
<script path="public/javascript/basic_dom.js">
function has_class(elm, checkClass)
    {f (elm == null || checkClass == null || elm.className ==
undefined)
        {return false;}
    return
elm.className.toLowerCase().indexOf(checkClass.toLowerCase()) != -
1;}
function remove_class(elm, removeClass){
    if (!has_class(elm, removeClass)){
        return false;}
    var elementClasses = elm.className.split(" ");
    var newClass = "";
    for (var i=0;i<elementClasses.length;i++){
        var nextClass = elementClasses[i];
        if (nextClass != removeClass)
        { newClass += nextClass + " ";}}
    elm.className = newClass;
    return true;}
function add_class(elm, addClass){
    if (has_class(elm, addClass)){
        return false;}
    elm.className = elm.className + " " + addClass;
    return true;}
</script> <script type="text/javascript" language="javascript">
function moovweb_toggle_accordian(link_id, content_id){
    var link = document.getElementById(link_id);
    var content = document.getElementById(content_id);
    if (has_class(link, "moovweb_open")) {
        remove_class(link, "moovweb_open");
        content.style.display = 'none';}
    else
    {add_class(link, "moovweb_open");
     content.style.display = 'block';}
} </script>
</head>
```

⋮ (CONTINUED FROM FIG. 27A)

```
<body>
<div class="alpha">          LINK-ELEMENT 2520
<h1 id="bodydiv1h1"
onclick="moovweb_toggle_accordian('bodydiv1h1',
'bodydiv1div')">First line</
h1>                                   CONTENT-ELEMENT 2525
    <div class="content" id="bodydiv1div" style=";display:
none;">
Imagine that there were a lot of content here. On a mobile
device it might be easier to navigate the page if you saw only
the heading for this content and not the content itself. You
could always see this content by tapping on the header.
</div> </div>
<div class="beta">   LINK-ELEMENT 2530
<h1 id="bodydiv2h1"
onclick="moovweb_toggle_accordian('bodydiv2h1',
                                              CONTENT-ELEMENT 2535
'bodydiv2div')">Second line</
h1> <div class="content" id="bodydiv2div" style=";display:
none;">
Imagine that there were a lot of content here. On a mobile
device it might be easier to navigate the page if you saw only
the heading for this content and not the content itself. You
could always see this content by tapping on the header.
</div>
</div>
</body>
</html>
```

FIG. 27B

CONFIGURABLE AND DYNAMIC TRANSFORMATION OF WEB CONTENT

CROSS-REFERENCE TO RELATED APPLICATIONS

This application claims the benefit under 35 U.S.C. § 120 as a continuation of U.S. patent application Ser. No. 17/409,529, filed Aug. 23, 2021, and now U.S. Pat. No. 11,677,857, which claims the benefit under 35 U.S.C. § 120 as a continuation of U.S. patent application Ser. No. 12/911,689, filed Oct. 25, 2010, and now U.S. Pat. No. 11,102,325, which claims the benefit under 35 U.S.C. § 119 (e) of U.S. Provisional Application No. 61/279,596, filed Oct. 23, 2009, each of which is hereby incorporated by reference in its entirety.

FIELD

Embodiments of the invention relate to the field of data processing systems; and more specifically, to a configurable and dynamic transformation of web content.

BACKGROUND

Mobile web access is becoming a common way for viewing websites as more mobile devices are sold that are capable of accessing the web. Since websites are typically designed to be rendered on a non-mobile browser on a computing device (e.g., a desktop, laptop, etc.), they may not be optimally designed for viewing on a mobile browser of a mobile device (e.g., a mobile device such as a smartphone has a limited viewing area). Many websites have a corresponding mobile version that is converted for mobile browsers.

One mobile conversion technique involves the use of automatically transcoding a page when requested by a mobile browser. This automatic transcoding typically removes all client-side scripts (e.g., JavaScript, VBScript) and does not support cookies. Thus, unless the web page that is being transcoded is relatively simple, the automatic transcoder will not include the same functionality as its non-mobile version. In addition, the automatic transcoding is typically not customizable by owners and/or operators of the mobile web page. Thus, the same automatic transcoding rules are typically applied to each web page regardless of the characteristics of that web page, which can lead to widely varying results.

Another mobile conversion technique involves the use of custom templates for a web page (e.g., an HTML page). For example, an operator selects elements from the non-mobile HTML web page and creates a custom mobile template to display those elements. The custom templates need to be created for each web page of a website. Upon receiving a request from a mobile browser for that web page, the HTML of the page is run through an extraction process (sometimes referred to as a scraping process) that requires custom extraction code to extract the specified elements and insert them into the custom HTML template for that web page. If the extraction process cannot find the elements it expects, the result is either missing information or an error page. Only those elements which are extracted to fit the template will appear in the mobile version of the page. If a new feature is added to the non-mobile web page, a new template (or a modified template) must be created and new extraction code must be written in order for that feature to be added to the mobile web page. In addition, if an element is moved on the non-mobile page, the extraction code needs to be updated with the new information; otherwise the mobile-web page will display with missing information or an error page. Thus the use of custom templates requires a significant amount of configuration. In addition, most optimization techniques that use custom templates do not include functionality for client-side scripts or support the cookies issued by the origin server.

SUMMARY

Dynamically transforming web content is described herein. An HTTP request is received from an Internet client and the web resource that is identified in the HTTP request is accessed. The content of the web resource is analyzed and a set of transformation instructions are applied on a set of identified portions of the content of the web resource. Each applied transformation instruction includes logic to locate and manipulate at least an identified portion of the content, and at least one of the applied transformation instructions is a client-side script transformation instruction that performs one or more of: modify a client-side script included in the content, remove a client-side script included in the content, and add a client-side script to the content. An HTTP response is rendered that includes the results of the applied transformation instructions and further includes those portions of the content that were not manipulated by a transformation instruction. The response is then transmitted to the Internet client.

BRIEF DESCRIPTION OF THE DRAWINGS

The invention may best be understood by referring to the following description and accompanying drawings that are used to illustrate embodiments of the invention. In the drawings:

FIG. 3 illustrates an exemplary request according to one embodiment;

FIG. 4 illustrates an exemplary modified request according to one embodiment of the invention;

FIG. 6 illustrates an exemplary response according to one embodiment.

FIG. 7 illustrates an exemplary client-side script to override the functionality of an existing Ajax request object included in the response that, when executed by an Internet client, rewrites URLs to refer to the dynamic web content transformation server;

FIG. 20 illustrates a exemplary alternative CSS document;

FIG. 21 illustrates the exemplary HTML document illustrated in FIG. 11 after an AddCSS transformation instruction has been applied according to one embodiment;

FIG. 22 illustrates the rendered view of the HTML document illustrated in FIG. 21;

FIG. 23 illustrates the exemplary HTML document illustrated in FIG. 11 after an InlineCSS transformation has been applied according to one embodiment;

FIG. 24 illustrates the rendered view of the HTML page illustrated in FIG. 23;

FIG. 25 illustrates an exemplary HTML document source where an Accordion transformation instruction will be applied according to one embodiment;

FIG. 26 illustrates a rendered view of the exemplary HTML document illustrated in FIG. 25;

FIGS. 27A-B illustrate the exemplary HTML document of FIG. 25 after the Accordion transformation is applied according to one embodiment;

DESCRIPTION OF EMBODIMENTS

Figure 1:
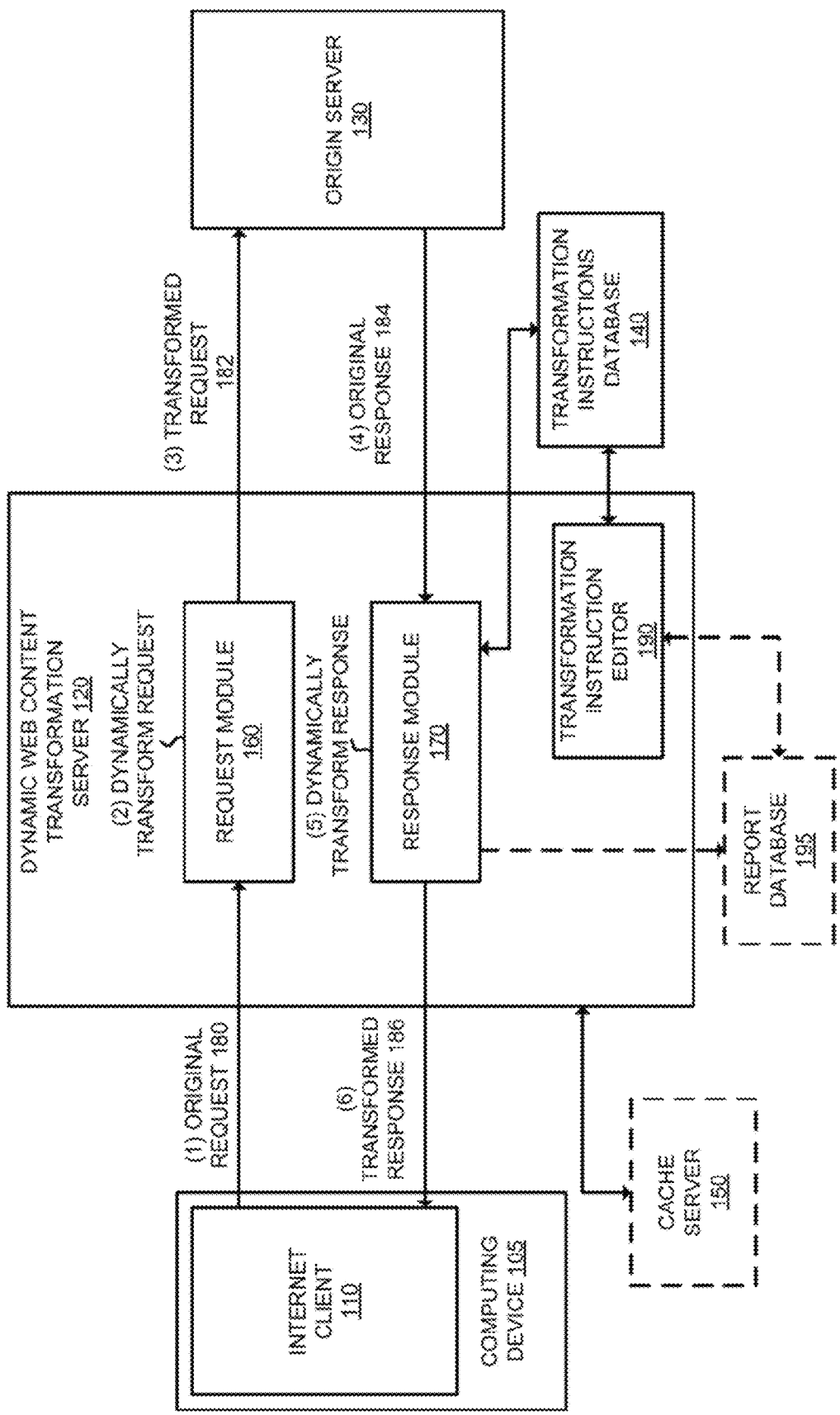
FIG. 1 illustrates an exemplary system for dynamically rehosting a website according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Dynamically Rehosting Web Content

A method and apparatus for dynamically rehosting web content is described. In one embodiment, responsive to a dynamic web content transformation server receiving from an Internet client an HTTP request for a resource that is hosted at an origin server, the dynamic web content transformation server modifies the host header field in the request to refer to the origin server and transmits the modified HTTP request to the origin server. The dynamic web content transformation server receives an HTTP response from the origin server that includes the requested resource. The dynamic web content transformation server analyzes the resource and determines whether each URL reference in the resource should refer to either the origin server or to the dynamic web content transformation server. For those URL references that are to refer to the origin server and are relative links, the dynamic web content transformation server transforms those URL references such that they refer to the origin server (e.g., by inserting the origin server's URL and path of the resource). Those URL references that are to refer to the origin server and are absolute links are not modified. For those URL references that are to refer to the dynamic web content transformation server and are absolute links, the dynamic web content transformation server transforms those URL references to refer to the dynamic web content transformation server (e.g., by transforming them into a new absolute URL that refers to the dynamic web content transformation server instead of the origin server). Those URL references that are to refer to the dynamic web content transformation server and are relative links are not modified. The dynamic web content transformation server renders an HTTP response with the modifications to the resource, and transmits the modified HTTP response to the Internet client.

In one embodiment, an operator of the dynamic web content transformation server configures the dynamic web content transformation server with rehosting transformation instructions that indicate whether the URL(s) included in the response should refer to the origin server or to the dynamic web content transformation server. In one embodiment the rehosting transformation instructions also include logic to locate and manipulate the URL(s) included in the response.

In one embodiment where there is at least one URL reference that is contained within a client-side script (e.g., JavaScript, VBScript) included in the resource and a transformation instruction indicates that the URL reference should refer to the dynamic web content transformation server, the dynamic web content transformation server applies that transformation instruction to override the original client-side script with a new client-side script that, when executed by the Internet client, dynamically rewrites the URL reference to refer to the dynamic web content transformation server. In one embodiment this allows Ajax requests to passthrough the dynamic web content transformation server.

In an embodiment where the request includes a cookie that refers to a domain associated with the dynamic web content transformation server, the dynamic web content transformation server rewrites the cookie domain to refer to the domain associated with the origin server. When the response includes a Set-Cookie header that includes a domain parameter that refers to a domain associated with the origin server, the dynamic web content transformation server transforms the domain parameter to refer to a domain associated with the dynamic web content transformation server.

In one embodiment, the domain associated the origin server is a subdomain of the domain associated with the dynamic web content transformation server. For example, the hostname of the dynamic web content transformation server is added to the end of the domain part of the original domain associated with the origin server. By way of example, an origin server that is reached with the URL http://example.com is mapped to the URL http://example.moovweb.com that resolves to the dynamic web content transformation server. As another example, an origin server that is reached with the URL http://mail.example.com is mapped to the URL http://mail.example.moovweb.com that resolves to the dynamic web content transformation server. As another example, an origin server that is reached with the URL http://example.com/?q=help is mapped to the URL http://example.moovweb.com/?q=help. As yet another example, an origin server that is reached with the URL http://example.org is mapped to the URL http://example.org.moovweb.com. As yet another example, an origin server that is reached with the URL http://example.com/example is mapped to the URL http://example.moovweb.com/example. Thus in this embodiment, the subdomains are preserved in the URL mapping scheme and therefore the cookies are preserved.

In one embodiment at least a portion of a website's domain, subdomain, and/or path is rehosted in order for the dynamic web content transformation server to dynamically transform non-mobile pages of the website's domain, subdomain, and/or path into mobile versions.

FIG. 1 illustrates an exemplary system for dynamically transforming web content according to one embodiment. For example, the system in FIG. 1 can dynamically rehost at least a portion of one or more website's domain, subdomain, and/or path. The system includes the computing device 105 that implements the Internet client 110, the dynamic web content transformation server 120, the origin server 130, and the transformation instructions database 140. The system also includes the transformation instruction editor 190, which will be described in more detail later herein, and optionally includes the cache server 150 and the report database 195.

The Internet client 110 is an entity that makes requests over computer networks (e.g., a web browser controlled by a user, an automated software program such as a web crawler) for resources (e.g., HTML pages, binary data, a JavaScript file, a CSS (Cascading Style Sheets) file, etc.). In one embodiment the computing device 105 is a non-desktop or non-laptop personal computer such as a mobile computing device (e.g., a mobile phone, smartphone, PDA, portable media player, GPS device, gaming device, etc.), a kiosk, a set top box, or other device that has a non-laptop or non-desktop form factor. In one embodiment the Internet client 110 is a mobile browser. It should be understood that a mobile computing device such as a mobile phone or smartphone has different characteristics than computing devices such as workstations or laptops. For example, a mobile computing device such as a mobile phone or smartphone typically has a relatively small display.

The dynamic web content transformation server 120 is coupled between the computing device 105 and the origin server 130 and dynamically transforms at least part of the website. In one embodiment, the dynamic transformation includes dynamically rehosting at least part of the website on behalf of the origin server 130. For example, in one embodiment the dynamic web content transformation server 120 operates in real-time and receives requests for resources (e.g., HTTP requests for web pages) hosted on the origin server 130 and can initiate requests to other servers (external to the origin server 130). Responses from the origin server 130 (e.g., HTTP responses) may also pass through the dynamic web content transformation server 120. The origin server 130 is a server that hosts resources for a website. By way of example, the origin server 130 is reached at the URL address http://example.com and the dynamic web content transformation server 120 is reached at the URL address http://example.moovweb.com with an alias of http://m.example.com. In one embodiment, an administrator of the domain example.com changes the domain record such that http://m.example.com points to the dynamic web content transformation server 120. Thus, by way of example, when the Internet client 110 makes a request on the domain m.example.com (or example.moovweb.com), the request resolves to the dynamic web content transformation server 120. It should be understood that although FIG. 1 illustrates a single computing device 105 coupled with the origin server 130, typically there are many computing devices that issue requests and receive replies from the dynamic web content transformation server 120. It should also be understood that the dynamic web content transformation server 120 may be at least partially rehosting websites on behalf of multiple origin servers belonging to multiple websites.

In one embodiment, the dynamic web content transformation server 120 provides the dynamic web content transformation as a service on behalf of the domain hosted at the origin server 120 (and potentially other domains hosted at different servers). In such an embodiment, the dynamic web content transformation server 120 is not owned or directly controlled by the owner(s)/operator(s) of the domains it is providing content transformation services for. In another embodiment, the dynamic web content transformation server 120 is included as part of an infrastructure of a domain owner, and may be included as part of an origin web server. In such an embodiment, the dynamic web content transformation server 120 typically does not provide a third party transformation service for other domains.

Figure 2:
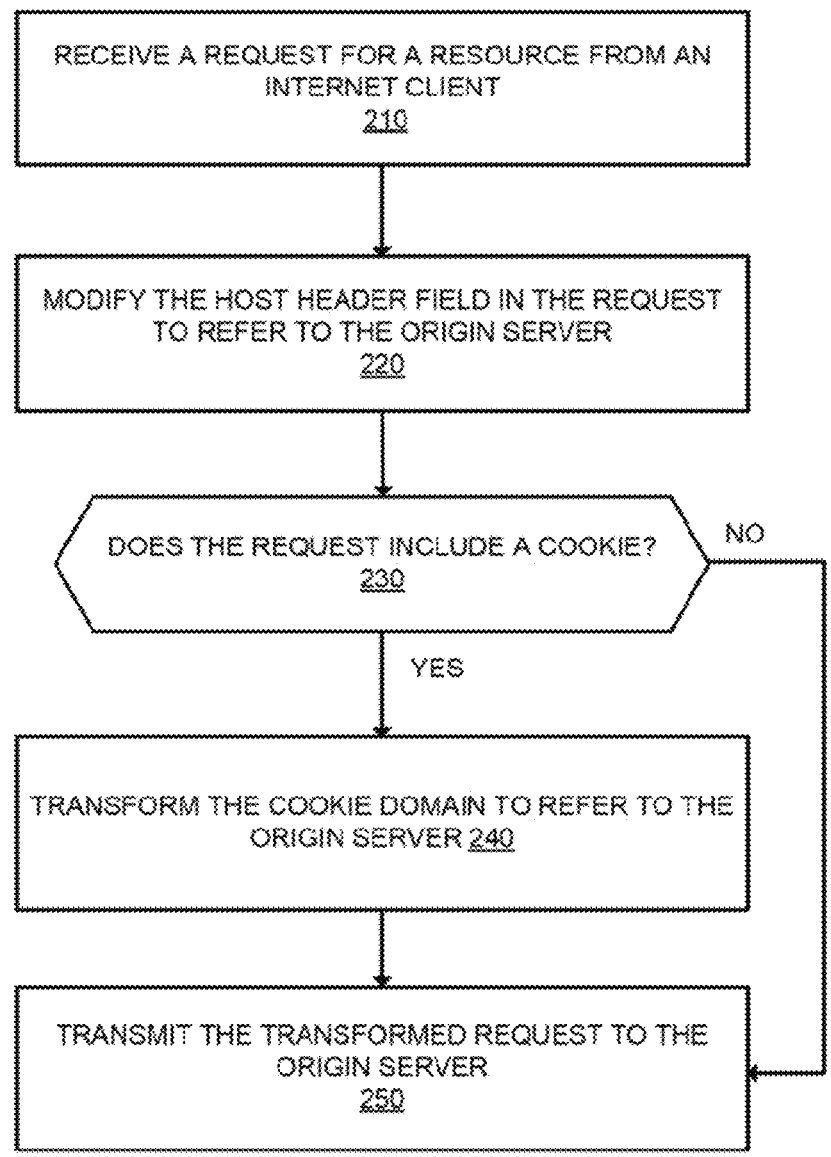
FIG. 2 is a flow diagram illustrating exemplary operations for a dynamic web content transformation server modifying requests according to one embodiment of the invention.

In one embodiment, the dynamic web content transformation server 120 dynamically transforms requests for resources issued by the Internet client 110. FIG. 2 is a flow diagram illustrating exemplary operations for a dynamic web content transformation server transforming requests according to one embodiment. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2.

With reference to FIG. 1, at a time 1, the Internet client 110 issues the request 180. In one embodiment, the request 180 (e.g., an HTTP request) is for a resource originally hosted by the origin server 130 that is designed to be rendered on a non-mobile Internet client. By way of example, FIG. 3 illustrates an exemplary request 180. As illustrated in FIG. 3, the exemplary request 180 is an HTTP POST request that includes information for the HTML file /activities/index.html at the host www.example.moovweb.com as indicated by the host header field 310. In one embodiment, unless that HTML file is cached by the dynamic web content transformation server 120, which will be described in greater detail later herein, the dynamic web content transformation server 120 does not have local access to that HTML file and therefore transmits the request, on behalf of the Internet client 110, to the origin server 130. Although the request 180 is for an HTML file, it should be understood that this is exemplary as the requests may be for a different type of resource. In addition, although the request 180 is a POST request, it should be understood that other request methods may be received and processed by the dynamic web content transformation server 120 (e.g., GET, HEAD, PUT, etc.). It should also be understood the header of the request 180 can include further information (e.g., User-Agent, Date, or other header fields defined RFC 2616 or RFC 4229).

The request 180 can be issued from the Internet client 110 directly to the dynamic web content transformation server 120 (e.g., a user can enter in the URL in their browser that points to the dynamic web content transformation server 120) or be issued as a result of being redirected by the origin server 130. For example, the origin server 130 may determine that the resource that is returned should be a mobile version of that resource. For example, the website associated with the origin server may use a particular naming convention for mobile versions of its pages (e.g., http://m.example.com may refer to the mobile version of http://example.com) such that if the request matches that naming convention the request is for a mobile version of the resource. The origin server 130 may also determine that the request is for a mobile version (or from a mobile device) based on the User-Agent of the Internet client 110 (the User-Agent may identify that the computing device 105 is a mobile device and/or using a mobile-browser). As another example, the origin server 130 may also determine that the request is for a mobile version (or from a mobile device) based on the value of a cookie being sent by the computing device 105. If the request is from a mobile device and/or is requesting a mobile version of the resource, then the origin server 130 can redirect the Internet client 110 to the dynamic web content transformation server 120.

With reference to FIG. 2, the dynamic web content transformation server 120 receives the request 180, issued from the Internet client 110, at operation 210. Flow moves to block 220. At a time 2, the request module 160 transforms the request and flow moves to operation 230. With reference to FIG. 220, the request module 160 modifies the value in the host header field in the request 180 to refer to the origin server 130. For example, with reference to FIG. 3, the value in the host header field 310 is modified from www.example.moovweb.com to www.example.com. FIG. 4 illustrates the modified request 182 with the modified value of the host header field 310.

In one embodiment, if the request 180 includes a cookie that has a cookie domain of www.example.moovweb.com, the dynamic web content transformation server 120 modifies the cookie domain to refer to www.example.com. With respect to FIG. 2, at operation 230, the dynamic web content transformation server 130 determines whether the request includes a cookie. If the request includes a cookie, then flow moves to operation 240 and the dynamic web content transformation server 120 transforms the cookie domain to refer to the origin server and flow moves to block 250. If the request does not include a cookie, then flow moves to block 250. At a time 3 and with respect to operation 250, the dynamic web content transformation server 120 transmits the transformed request 182 to the origin server 130.

The origin server 130 processes the request 182 and, at a time 4, transmits the response 184 to the dynamic web content transformation server 120. In one embodiment, the response 184 is designed to be rendered on a non-mobile Internet client and includes the entire HTML, CSS, JavaScript and/or other elements that are natively in the response 184. FIG. 6 illustrates an exemplary response 184. As illustrated in FIG. 6, the response 184 includes an HTML document, however it should be understood that responses can take on different forms depending on the request (e.g., binary data, JSON (JavaScript Object Notation) data, XML (Extensible Markup Language) data, a JavaScript file, a CSS file, RSS (Really Simple Syndication) feeds, Ajax responses, web services, etc.).

The dynamic web content transformation server 120 dynamically transforms responses issued by the origin server 130. For example, in one embodiment, at least some of the elements of the responses that include a URL are automatically transformed such that they refer to the dynamic web content transformation server 120. Thus at a time 5, the response module 170 dynamically transforms the response 184 such that at least some of the elements of the response refer to the dynamic web content transformation server 120 instead of the origin server 130.

In one embodiment, dynamically transforming the response 184 begins with the entire response (e.g., the entire HTML, CSS (if included), client-side scripts (if included), Ajax requests (if included), etc.) and the dynamic web content transformation server 120 dynamically transforms selective element(s) of the response. In one embodiment, the dynamic web content transformation server 120 applies one or more transformation instructions to the response to determine which element(s) to transform and how those element(s) should be transformed. Each transformation instruction includes logic to locate and manipulate at least an identified portion of the content from an input source (typically from the response). For example, the response is analyzed and compared with one or more transformation instructions to determine whether one or more transformation instruction should be applied and what element(s) they should be applied to.

The transformation instructions may include rehosting transformation instructions to transform at least some of the elements in the response 184 that include a URL to refer to the dynamic web content transformation server 120 instead of the origin server 130. The rehosting transformation instructions also can support for rehosting client-side scripts (e.g., Ajax requests). By way of example, rehosting certain element(s) of a site allows the reuse of existing customer business logic for the rehosted resource (which may be formatted for mobile use). For example, if a web page has a shopping cart feature with a purchasing backend, that feature can automatically be included on the mobile version of that web page and leverage the existing purchasing backend.

Those element(s) of the response 184 that are not transformed (e.g., they do not match any transformation instructions) are included in the transformed response. As a result, unlike an optimization technique that uses custom templates, in embodiments of the invention described herein, when a feature is added to the resource hosted at the origin server (e.g., a new feature added to the page example.com), that feature will be included on the transformed response (unless there is a transformation instruction that matches that new feature and removes that feature). For example, new features added to a web page at the origin server (e.g., features added to the non-mobile web page) typically will appear on the transformed web page without requiring further configuration. In addition, the dynamic transformation of the response described herein includes support for client-side scripts (including Ajax requests) and/or cookies. For example, an Ajax search feature of a non-mobile web page will work on the dynamically transformed mobile web page.

Figure 5:
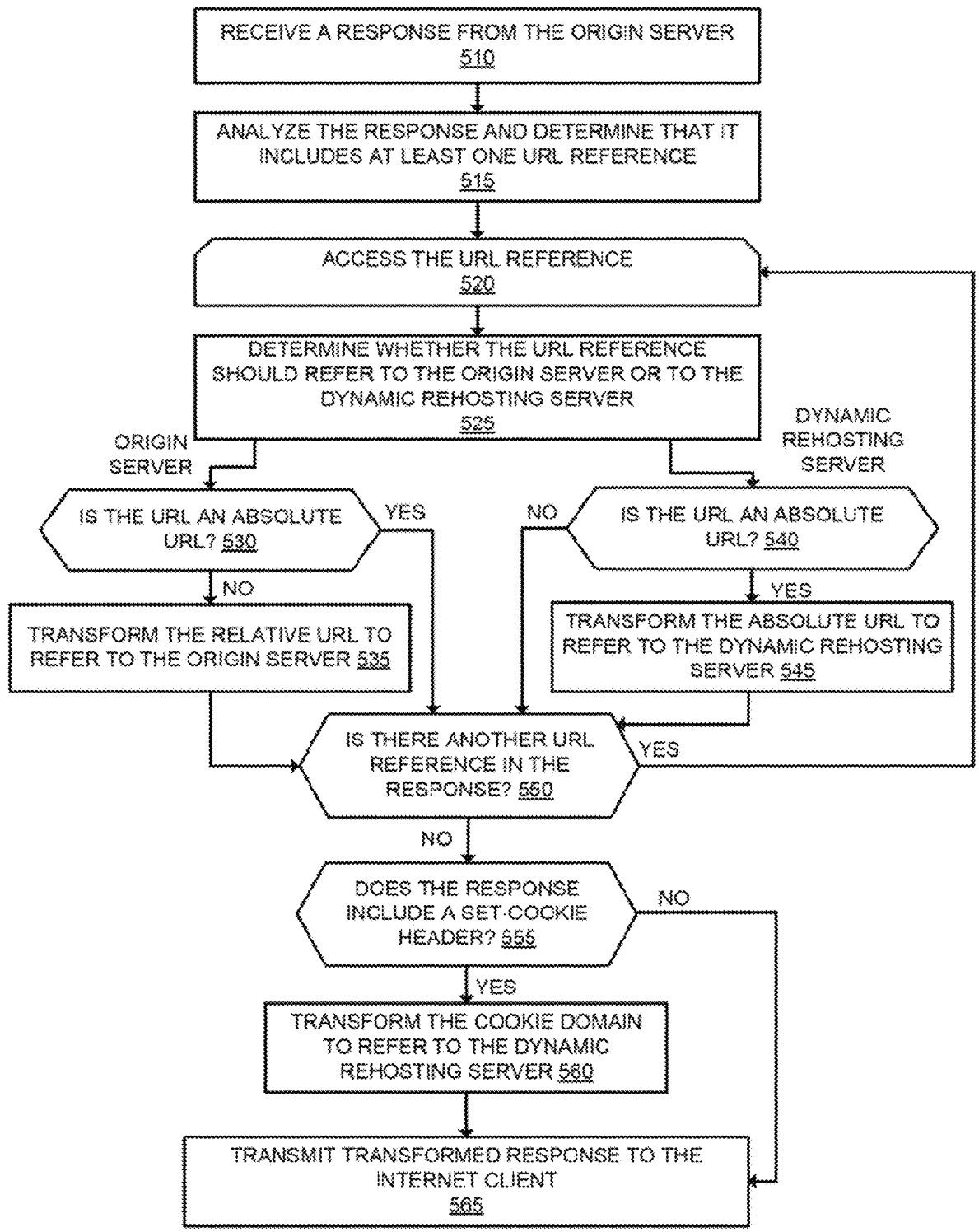
FIG. 5 is a flow diagram illustrating exemplary operations for a dynamic web content transformation server modifying responses received from an origin server according to one embodiment of the invention.

FIG. 5 is a flow diagram illustrating exemplary operations for a dynamic web content transformation server dynamically transforming responses according to one embodiment. The operations of FIG. 5 will be described with reference to the exemplary embodiment of FIG. 1. However, it should be understood that the operations of FIG. 5 can be performed by embodiments of the invention other than those discussed with reference to FIG. 1, and the embodiments discussed with reference to FIG. 1 can perform operations different than those discussed with reference to FIG. 5.

With reference to FIG. 5, at operation 510, the dynamic web content transformation server 120 receives the response 184 from the origin server 130. Flow moves from operation 510 to operation 515. At operation 515, the response module 170 analyzes the response 184 and determines that it includes at least one URL reference. For example, the response module 170 scans the response 184 to detect URLs that are located within one or more of: the "action" attribute of a <FORM> element; the "href" attribute of an <A> element and/or a <LINK> element; the "src" attribute of an <IMG>, <SCRIPT>, <FRAME>, and/or <IFRAME> element; the "url( )" value in a CSS style value and/or CSS @import reference; and URL(s) in scripts (such as JavaScript and VBScript). Flow moves from operation 515 to operation 520 and the response module 170 accesses a detected URL reference and flow moves to operation 525.

At operation 525, the response module 170 determines whether that URL reference should refer to the origin server 130 (thereby bypassing the dynamic web content transformation server 120) or to the dynamic web content transformation server 120 (thereby passing through the dynamic web content transformation server 120). In one embodiment, all URL(s) in the response 184 should refer to the dynamic web content transformation server 120. In another embodiment, an operator of the dynamic web content transformation server 120 configures one or more rehosting transformation instructions that indicate whether the URL(s) included in the response should refer to the origin server 130 or to the dynamic web content transformation server 120. In one embodiment, these rehosting transformation instructions can be configured differently for different elements. By way of example, the rehosting transformation instructions can be configured such that image assets or CSS files refer to the origin server 130 while URLs in scripts, anchor tags, form actions, and/or other HTML elements that include URL attributes refer to the dynamic web content transformation server 120. With reference to the exemplary response 184 illustrated in FIG. 6, rehosting transformation instructions have been configured such that all images (as indicated by an <IMG> element) should refer to the origin server 130 and all anchors (as indicated by an <A> element) should refer to the dynamic web content transformation server 120 thereby allowing a user to navigate the web with those requests going through the dynamic web content transformation server 120 (without the user having to change their browser settings to apply a proxy).

Some responses may include a reference to an external client-side script file (e.g., JavaScript include via a <SCRIPT> element with a "src" attribute). In one embodiment, the rehosting transformation instructions are configured to indicate that external client-side script files should refer to the dynamic web content transformation server 120 (thus passing through the server 120). Other types of assets can also passthrough the dynamic web content transformation server 120 (e.g., forms, style tags, CSS import statements, other types of JavaScript commands such as window.location=, meta tags, iframe tags, frameset tags, etc.).

In one embodiment, different rehosting transformation instructions can be applied to different domains, subdomains, and/or paths. For example, different rehosting transformation instructions can be applied to a main page of a website as compared to the rehosting transformation instructions that are applied to a checkout page of a website. In one embodiment, the rehosting transformation instructions are stored in the transformation instructions database 140 and accessed by the response module 170 to determine whether the URL reference should either refer to the origin server 130 or to the dynamic web content transformation server 120, although in other embodiments the rehosting transformation instructions are stored locally on the server 120.

With reference back to FIG. 5, if the rehosting transformation instructions indicate that the URL should refer to the origin server 130, then flow moves to operation 530. If the rehosting transformation instructions indicate that the URL should refer to the dynamic web content transformation server 120, then flow moves to operation 540.

At operation 530 (the URL is to point to the origin server 130), the response module 170 determines whether the URL is an absolute URL (or at least including a domain) or is a relative URL that lacks a domain. For example, with reference to FIG. 6, the URL 660 is a relative URL and the URL 665 is an absolute URL. As another example, the URL string located within the client-side script 630 includes a domain so it is treated as an absolute URL. The URL string located within the client-side script 640 does not include a domain so it is treated as a relative URL. Since the URL is to point to the origin server 130, it does not need to be modified if it is an absolute URL. However, if the URL is a relative URL, then it needs to be transformed such that it will refer to the origin server 130 (e.g., by transforming it into an absolute URL that refers to the origin server 130). It should be understood that relative URLs that are not modified will refer to the dynamic web content transformation server 120. Thus, with reference to FIG. 6, the absolute URL 665 is not modified but the relative URL 660 needs to be transformed into an absolute URL pointing to the origin server 130.

If the URL is a relative URL, then flow moves to operation 535 and the response module 170 transforms the relative URL to refer to the origin server 130. For example, the URL is transformed into an absolute URL that refers to the origin server 130 by inserting the origin server's URL and path. For example, with reference to the relative URL 660, it is transformed from img/batman.png into http:// example.com/activities/img/batman.png. Flow moves from operation 535 to operation 550.

The response 184 can include client-side scripts (e.g., JavaScript, VBScript, etc.) that, when executed by the Internet client 110, generates the URL. For example, with reference to FIG. 6, the final URL value that results from the client-side script 640 (window.location="buytickets/"+movieName) being executed on the Internet client 110 will occur after the response 184 has passed through the dynamic web content transformation server 120 (in this example the final URL depends on the value of movieName). As a result, the dynamic web content transformation server 120 cannot determine the absolute URL value directly from the response 184. In such a case, in one embodiment the response module 170 parses the script and replaces or modifies the appropriate URL string to cause the URL to refer to the origin server 130.

If the URL is an absolute URL, then flow moves to operation 550. It should be understood that the absolute URL is not modified. At operation 550, the response module 170 determines whether there is another URL reference in the response. If there is, then flow moves back to operation 520 and the next URL reference is accessed. If there is not, then flow moves to operation 555.

Referring back to operation 540 (the URL is to point to the dynamic web content transformation server 120), the response module 170 determines whether the URL is an absolute URL. For example, with reference to FIG. 6, the URL 670 is a relative URL and the URL 675 is an absolute URL. Since the URL is to point to the dynamic web content transformation server 120, it does not need to be modified if it is a relative URL. However, if the URL is an absolute URL, then it needs to be transformed into an absolute URL that points to the dynamic web content transformation server 120 or alternatively transformed into a relative URL. Thus, with reference to FIG. 6, the relative URL 670 is not modified but the absolute URL 675 needs to be transformed such that it will point to the dynamic web content transformation server 120.

If the URL is an absolute URL (or at least includes a domain in case the URL is within a client-side script), then flow moves to operation 545 and the response module 170 transforms the URL to refer to the dynamic web content transformation server 120. For example, with reference to the absolute URL 665, the response module 170 transforms it from http://example.com/fantasticfour into http://example.moovweb.com/fantasticfour. Thus, when the Internet client 110 follows the anchor tag, the request will be directed at the dynamic web content transformation server 120.

If the URL reference is within a client-side script, in one embodiment the response module 170 parses the client-side script to change the URL reference itself to replace or modify the appropriate URL string to make it refer to the dynamic web content transformation server 545. For example, the response module 170 modifies the string "http://example.com/activities/buytickets/" in the client-side script 630 to "http://example.moovweb.com/activities/buytickets".

In another embodiment where the URL reference is within a client-side script, the response module 170 overrides the native client-side script operations of that client-side script with new operations that rewrite the URL to refer to the dynamic web content transformation server 120 when executed by the Internet client 110. By way of example, an operator can configure the rehosting transformation instructions such that Ajax requests passthrough the dynamic web content transformation server 120. For example, with reference to FIG. 6, the function getShowtimes 650 is an Ajax request. In one embodiment, a new client-side script is added to the response that, when executed by the Internet client 110, replaces the functionality of the existing XMLHttpRequest.open( ) function (or a similar object such as ActiveXObject.open( )) with a customized XMLHttpRequest.open( ) function (or similar object such as ActiveXObject.open( )) that dynamically rewrites the URL(s) in the open( ) function to refer to the dynamic web content transformation server 120 instead of the origin server 130. Thus any Ajax requests made by that page will be transmitted to the dynamic web content transformation server 120 instead of the origin server 130.

FIG. 7 illustrates an exemplary client-side script 710 to override the functionality of the existing Ajax request object XMLHttpRequest.open( ) function included in the response 184 such that, when executed by the Internet client 110, it rewrites URLs to refer to the dynamic web content transformation server 120 instead of the origin server 130. The function moov_passthrough_link rewrites absolute URLs that refer to the origin server 130 to refer to the dynamic hosting server 120. In one embodiment relative URLs are not rewritten since they will already refer to the dynamic web content transformation server 120, however in another embodiment relative URLs are rewritten to absolute URLs that refer to the origin server 130. The function moov_open_passthrough( ) replaces the default open( ) function of the XMLHttpRequest object and, when executed by the Internet client 110, sends a URL to the function moov_passthrough_link before calling the newly added XMLHttpRequest open( ) function.

In some situations the response 184 includes a client-side script that generates a URL and adds it to the page. For example, client-side scripts for web analytics may commonly add a small image to the page. In one embodiment, the client-side script is rewritten to be rehosted by the dynamic web content transformation server 120 and the link is modified within the rehosted script such that when it executes on the Internet client 110, it will add the link (e.g., a link to an image) that refers to the dynamic web content transformation server 120.

Referring back to FIG. 5, after each URL reference in the response 184 is processed by the response module 170, flow moves to operation 555 and the response module 170 determines whether the response 184 includes a Set-Cookie header. If the response 184 does not include a Set-Cookie header, then flow moves to operation 565 and the transformed response is transmitted to the Internet client 110. However, if the response 184 includes a Set-Cookie header, then flow moves to operation 560 and the cookie domain is transformed to refer to the dynamic web content transformation server 120. For example, with reference to FIG. 6, the cookie domain 620 (which indicates a domain of .example.com) is changed to refer to the dynamic web content transformation server 120 (e.g., .example.moovweb.com). Changing the cookie domain ensures that the dynamic web content transformation server 120 will receive the cookie from the Internet client 110.

Thus, in one embodiment, cookies are supported by the dynamic web content transformation system. In addition, these cookies pass through the dynamic web content transformation server 120 (both from the origin server 130 and the Internet client 110). Thus the same cookies can be used between the mobile web page (e.g., the transformed response 186) as well as the corresponding non-mobile version of that web page. For example, if a user is logged into the mobile web page located at m.example.com and clicks on a "Full Site" link (which causes the Internet client to connect to the corresponding non-mobile version at example.com), the user will still be logged in. In this way, the cookies can be visible to both the mobile version of a website as well as the non-mobile version of the website.

Flow then moves to operation 565 and the transformed response is transmitted to the Internet client 110. With respect to FIG. 1, at a time 6, the transformed response 186 is transmitted to the Internet client 110. In the example described above, the transformed response will be a modified version of an HTML web page; however it should be understood that the transformed response may be of a different type of data (e.g., XML, RSS feeds, etc.). It should also be understood that the transformed response may include a type of data that is different than the input type.

In one embodiment, the portion(s) of the response which have not been transformed (e.g., they did not match the rules for a rehosting transformation instruction) are included in the transformed response 186. Thus, unlike mobile conversion techniques that require the use of custom templates and custom extraction code to transform the content, element(s) that do not match a transformation instruction are included in the rendered response (in the case of a custom template technique, elements that are not extracted and put in a template are not included in the response).

In some embodiments, the dynamic web content transformation system also includes the ability to cache resources. In such an embodiment, the dynamic web content transformation server 120 is coupled with the cache server 150. The dynamic web content transformation server 120 can cache data it receives from the origin server 130 and can also cache the result of its own operations. For example, the dynamic web content transformation server 120 can cache the transformed response 186 in the cache server 150. In some embodiments, only certain modifications are cached in the cache server 150, which can be configured by an operator of the dynamic web content transformation server.

Configurable and Dynamic Transformation of Internet Content

In one embodiment, the dynamic web content transformation server 120 dynamically transforms selective elements and/or attributes of selective elements of the response in order to format, optimize, modify, remove, and/or add new elements to the response prior to transmitting the transformed response to the Internet client. These transformation operations may be performed in addition to the rehosting transformation operations or may be performed without performing any rehosting transformation operations. In one embodiment, an operator configures a set of instructions to dynamically transform the response.

In one embodiment, the transformation instructions convert a resource of one type suitable for viewing/use on a class of device (e.g., a non-mobile resource for viewing/use on a device such as a desktop or laptop) into a form suitable for viewing/use on a different class of device (e.g., into a form suitable for viewing/use on a mobile browser of a computing device, into a form suitable for viewing/use on a set-top box, kiosk, or other class of computing device that has different user interface characteristics and/or device capabilities than the resource was originally designed for).

For example, a set of CSS transformation instructions may be configured by a user to modify, remove, and/or add CSS files in the response. By way of example, the set of CSS transformation instructions may include instructions to: add a custom CSS file to a web page to produce a new design or style (e.g., one optimized for a mobile browser on a mobile device having a particular screen size), remove an existing CSS file included in the response, and/or remove particular CSS attributes or attributes that meet a certain criteria (e.g., remove one or more of the STYLE and LINK [rel='stylesheet'] tags from the response, remove the '!Important' flags from the CSS, remove a LINK tag whose HREF matches a given path, remove a CSS property from a CSS file, etc.).

As another example, a set of visual formatting transformation instructions may be configured by a user to modify the visual appearance of the response when rendered. By way of example, the set of visual formatting transformation instructions may include instructions to: hide some of the content of the web page behind a button, which when selected by a user, causes the hidden content to be displayed, hide a list of content behind a header which, when selected by a user, causes the content to be displayed, and/or resize an image to increase the download speed, remove one or more elements from an HTML document, remove one or more attributes of one or more elements of an HTML document, replace one or more elements in an HTML document, and/or move one or more elements in an HTML document to another position in the document.

As another example, a set of client-side script transformation instructions may be configured by a user to modify, remove, and/or add client-side scripts in the response. By way of example, the set of client-side script transformation instructions may include instructions to: remove all client-side scripts from the response so that only the content and styles (if available) are present, and/or remove the client-side script onload from the response so that the client-side script does not immediately execute upon the page being loaded by the Internet client.

As another example, a set of optimization transformation instructions may be configured by a user to optimize the speed of processing of the response (e.g., by decreasing the amount of time necessary for initial page loading, etc.). By way of specific example, the set of optimization instructions may include instructions to: download remote CSS and/or client-side script files and inject their content into the response thereby reducing the number of web requests that the Internet client will make (this will increase speed on a high latency network), remove a portion of the HTML page in the response and replace it with a client-side script that fetches and injects the rest of the HTML thereby reducing the amount of time necessary to load the initial page, fetch HTML pages that the user is likely to select in the background and use a client-side script to inject the already loaded page when the user clicks on the preloaded link, shrink the size of images, remove unnecessary HTML (e.g., remove comment blocks), remove dependencies on large libraries and replace with smaller optimized libraries, load content later as the Internet client displays different parts of the page, loading links in the background and storing the results, etc.

In one embodiment, transformation instructions to be applied to a domain, subdomain, and/or path, can be modified (e.g., the parameters in the transformation instruction changed, re-ordering in the transformation instruction list, etc.) created (e.g., newly applied to the domain, subdomain, and/or path), and/or removed while the dynamic web content transformation server 120 is executing. Thus, the dynamic hosting server 120 does not need to be brought down for maintenance when changing the list of transformation instructions for a domain, subdomain, and/or path.

With reference to FIG. 1, in one embodiment the transformation instruction editor 190 allows an operator of the dynamic web content transformation server 120 to create and configure the transformation instructions (e.g., the rehosting transformation instructions, the CSS transformation instructions, the visual formatting transformation instructions, the client-side script transformation instructions, and/or the optimization transformation instructions).

In one embodiment, the transformation editor 190 is a web based interface that, for example, includes a text-editor for making real-time CSS and client-side script modifications and for creating new instructions, allows a user to select from a library of possible transformation instructions and configure the instructions, and allows a user to view the web page and the applied transformations in real time. While FIG. 1 illustrates the transformation instruction editor 190 as part of the dynamic web content transformation server 120, in other embodiments the transformation instruction editor 190 is located remotely from the dynamic web content transformation server 120.

Figure 8:
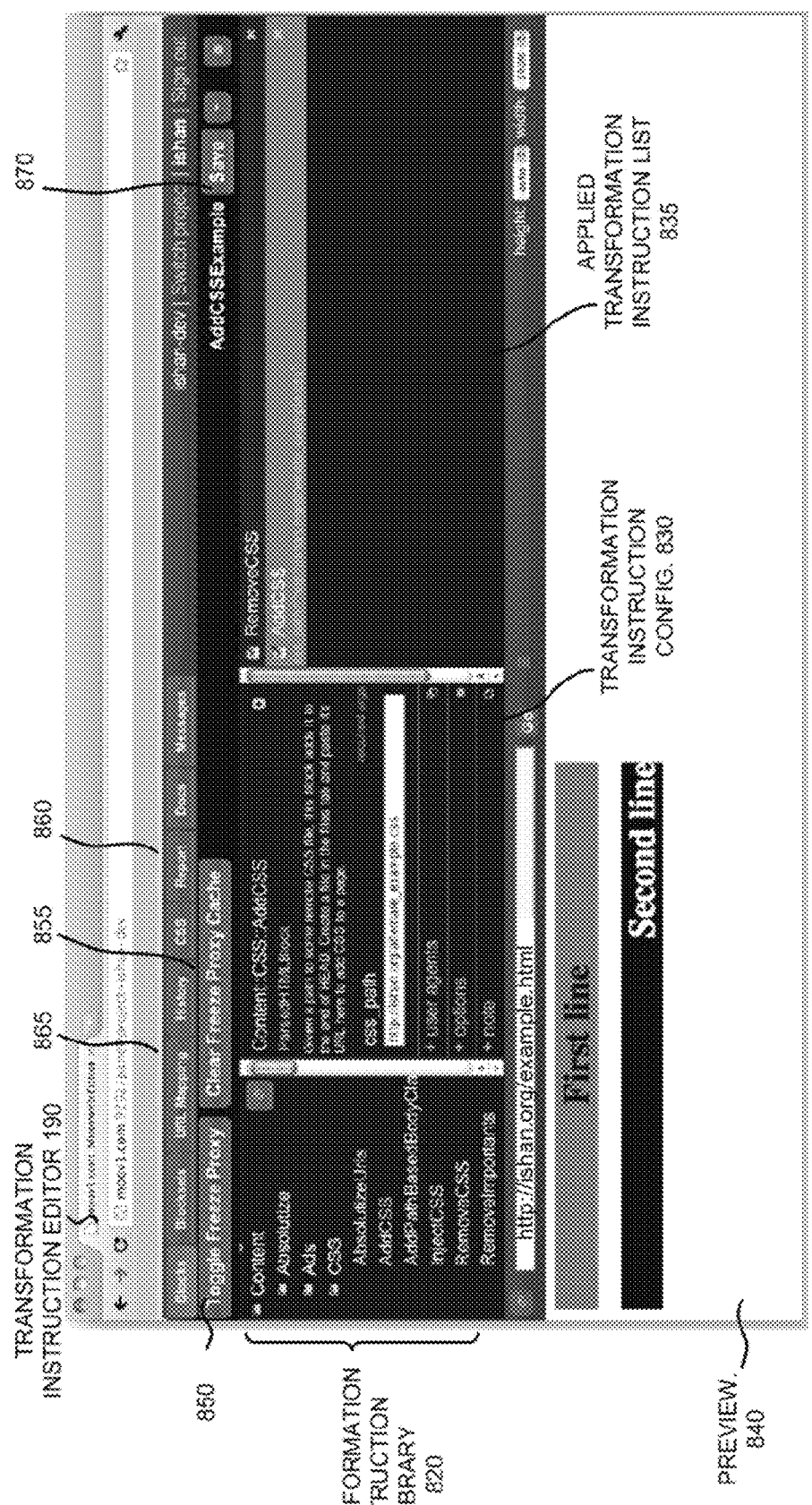
FIG. 8 illustrates an exemplary transformation editor according to one embodiment.

FIG. 8 illustrates an exemplary transformation editor 190 according to one embodiment. As illustrated in FIG. 8, the transformation editor 190 includes the transformation instruction library 820, the transformation instruction configuration panel 830, the applied transformation list 835, and the preview pane 840, and an operator is configuring transformation instructions for the HTML file located at http://ishan.org/example.html (it should be understood that this URL is exemplary).

The transformation instruction library 820 lists a number of predefined transformation instructions that the operator of the dynamic web content transformation server 120 can select from to apply to the resource that is loaded (in the example illustrated in FIG. 8 the resource is the HTML file at the location http://ishan.org/example.html). The predefined instructions may include the rehosting transformation instructions, the CSS transformation instructions, the visual formatting transformation instructions, the client-side script transformation instructions, and/or the optimization transformation instructions. In one embodiment, the instructions listed in the transformation instruction library 820 are not specifically designed for the resource in question. Rather, the transformation instructions that correspond to the instructions listed in the transformation instruction library 820 are reusable across multiple resources and websites. Although the transformation instructions in the transformation instruction library 820 represent predefined transformation instructions (the code has already been written to manipulate data in a predefined way), in one embodiment the transformation instruction editor 190 includes a text-editor for making real-time modifications (such as CSS and client-side script modifications) and for writing new instructions.

Each transformation instruction includes logic to locate and manipulate data from an input source (typically from the response) in a predefined way. At least some of the transformation instructions require one or more parameters to be configured by an operator of the dynamic web content transformation server 120 (some transformation instructions do not require parameters or have optional parameters). The parameters configure the code in the transformation instruction. The transformation instruction configuration panel 830 allows the operator to configure the parameters for the transformation instructions. As a result of an operator selecting one of the transformation instructions in the transformation instruction library 820, a list of arguments that need (or may) be configured for that transformation instruction is presented to the operator in the transformation instruction configuration panel 830. For example, as illustrated in FIG. 8, the CSS transformation instruction AddCSS, which when provided a path to a remote CSS file and executed will add that CSS file to the page (e.g., at the end of the HEAD), has been selected by the operator from the transformation instruction library 820 and a field for the operator to enter in the parameter for the path to the remote CSS file has been provided (e.g., input the path of the remote CSS file). Instructions are also provided to indicate to the operator what the parameter is and what should be selected. It should be understood that different transformation instructions may have different parameters (e.g., arguments) than other transformation instructions.

In one embodiment, the transformation instruction configuration panel 830 allows the operator to specify whether that transformation instruction is to apply to different user-agents (e.g., different mobile browsers). For example, some Internet clients can run a limited subset of client-side scripts or cannot run any client-side scripts, while other Internet clients can run all (or most) client-side scripts. To provide for such a case, as one example an operator can configure a transformation instruction that will remove all client-side scripts from the page for only those requesting Internet clients that cannot run any client-side scripts (i.e., the transformation instruction to remove all client-side scripts is only applicable to identified user-agents (it will not be applied to the other user-agents)).

In one embodiment, the transformation instruction configuration panel 830 allows the operator to specify whether that transformation instruction is cacheable (e.g., whether the result of the transformation instruction can be cached or should be executed again). By way of example, the operator may determine that user related or session related transformation instructions are not cacheable.

The applied transformation instruction list 835 displays an ordered list of transformation instructions (including their configured parameters) that will be applied to the resource. For example, the applied transformation instruction list 835 as illustrated in FIG. 8 includes the CSS transformation instruction RemoveCSS (which will remove the CSS from the page) and the CSS transformation instruction AddCSS, applied in that order. It should be understood that if the AddCSS instruction was applied before the RemoveCSS instruction, the RemoveCSS would remove the CSS style that was applied by the AddCSS transformation instruction. The applied transformation instruction list 835 also allows the operator to change the order of the transformation instructions and allows the operator to remove a transformation instruction permanently or temporarily.

In one embodiment, the transformation instruction editor 190 includes the preview pane 840 to allow the operator to preview the result of the transformation instructions that are applied. For example, FIG. 8 illustrates the result of the RemoveCSS transformation instruction and the AddCSS transformation instruction applied to the page located at http://ishan.org/example.html. Thus, as the operator is configuring the transformation instructions for a web page, the operator can quickly see the results of the transformation. Although FIG. 8 illustrates the preview pane 840 being located on the same page as the rest of the transformation instruction editor 190, in other embodiments the preview pane is located on a separate tab.

With respect to the exemplary transformation instruction editor 190, individual transformation instructions are referred to as blocks. A group of one or more ordered transformation instructions are referred to as blocksets, which may be defined by an operator of the editor. For example, with reference to FIG. 8, the operator may create the blockset AddCSSExample which includes the RemoveCSS transformation instruction followed by the AddCSS transformation instruction.

In one embodiment, the transformation instruction editor 190 allows the operator to configure URL mappings to indicate which transformation instructions are to be applied for a given URL. For example, when a response (e.g., the response 184) is received from an origin server, the dynamic web content transformation server 120 compares the URL of the response against the URL mappings to determine which transformation instructions are to be executed. In one embodiment, each URL mapping includes a blockset property, which indicates a name of a blockset that will be applied, a domain property that indicates a domain value for the mapping, a regular expression to identify particular URLs within the domain for the mapping, a support list that indicates one or more properties of the requesting computing device (the support list is optional), and an order number that indicates an order in which different URL mappings are to be applied.

Figure 9:
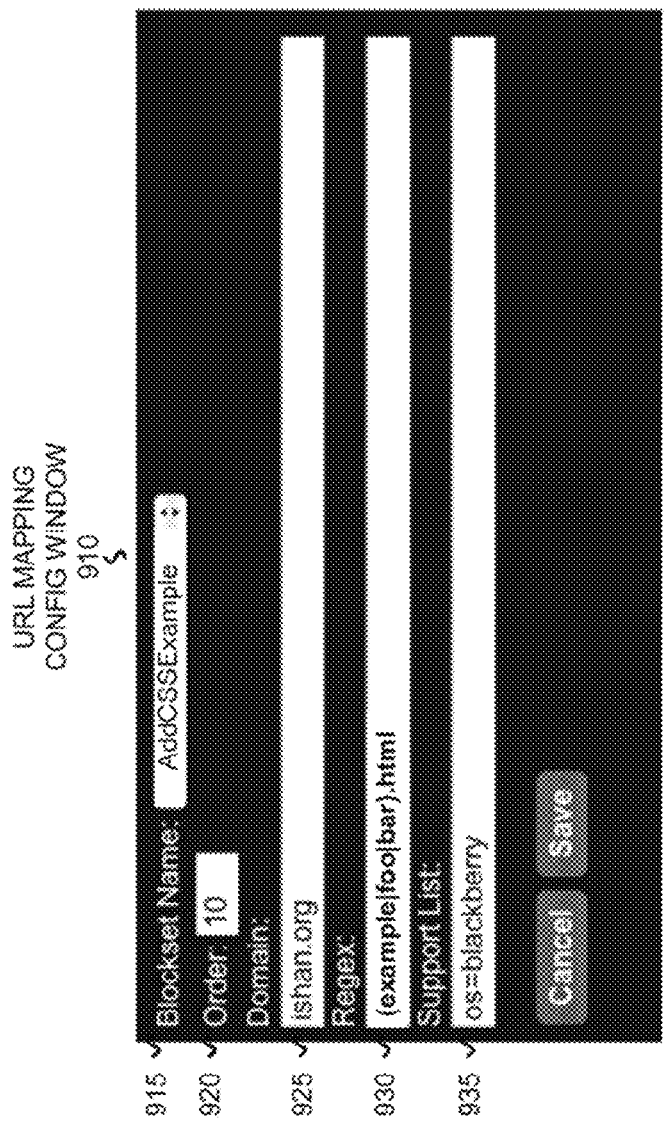
FIG. 9 illustrates an exemplary URL mapping configuration window according to one embodiment.

FIG. 9 illustrates an exemplary URL mapping configuration window according to one embodiment. The URL mapping configuration window 910, which is launched by the operator selecting the URL mapping tab 865, includes the blockset name field 915, the order field 920, the domain field 925, the regular expression (regex) field 930, and the support list field 935. As illustrated in FIG. 9, the domain field 925 includes a value of ishan.org. Thus, in order for a URL to match this mapping it must have a domain value of ishan.org. The regular expression field 930 has a value of (example|foo|bar).html. Thus, in order for a URL having a domain value of ishan.org to match this mapping, it must include either example.html, foo.html, or bar.html. The support list field 935 includes a value of os=blackberry, which indicates that only BlackBerry computing devices will match the mapping. This allows the operator to tailor the mapping to a specific device or a class of devices.

After the operator is finished configuring the transformation instructions, the operator can save the list of instructions (as ordered in the applied transformation instruction list 835) such that they will be applied for the matching URL mapping by selecting the Save button 870. In one embodiment the list of instructions to be applied for the domain, subdomain, and/or path are transmitted to the dynamic web content transformation server 120 and/or the transmitted and stored in the transformation instructions database 140.

Figure 10:
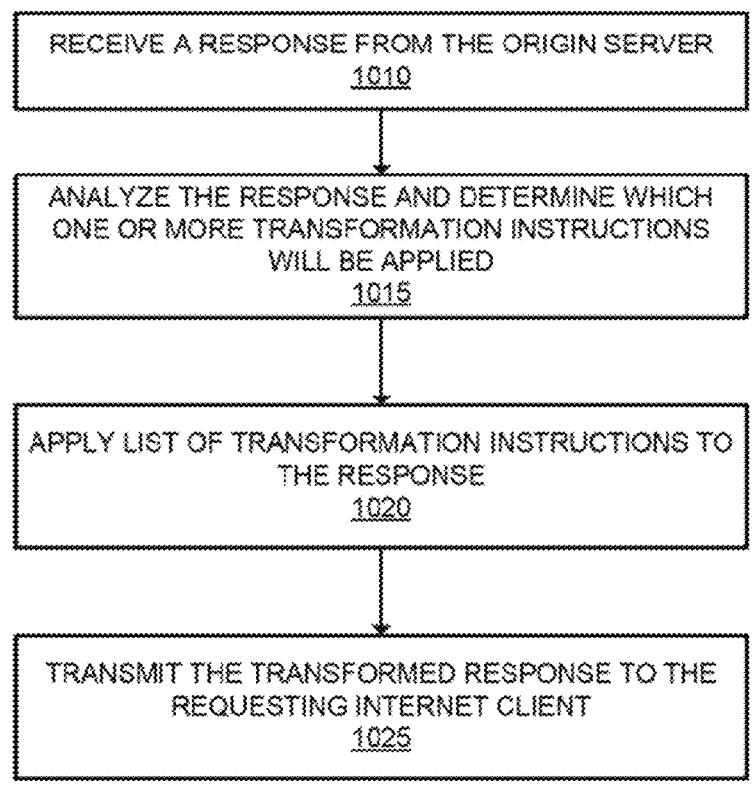
FIG. 10 is a flow diagram illustrating exemplary operations performed by the dynamic web content transformation server to dynamically transform web content according to one embodiment.

FIG. 10 is a flow diagram illustrating exemplary operations performed by the dynamic web content transformation server 120 to dynamically transform web content according to one embodiment. The operations of FIG. 10 will be described with reference to the exemplary embodiment of FIG. 1. However, it should be understood that the operations of FIG. 10 can be performed by embodiments of the invention other than those discussed with reference to FIG. 1, and the embodiments discussed with reference to FIG. 1 can perform operations different than those discussed with reference to FIG. 10. In addition, the operations of FIG. 10 will be described with reference to modifying a response received from an origin server (the request may be modified as described previously with respect to FIG. 2).

At operation 1010, the dynamic web content transformation server 120 receives a response from the origin server 120 (similar to the operation 510). Flow then moves to operation 1015 where the dynamic web content transformation server 120 analyzes the response and determines which one or more transformation instructions will be applied to identified portion(s) of the response. For example, the response module 170 accesses the URL mappings and compares the URL of the response against the URL mappings to determine which transformation instruction(s) are configured to be potentially applied to modify the response. In one embodiment, these transformation instructions include one or more of: the rehosting transformation instructions, the CSS transformation instructions, the visual formatting transformation instructions, the client-side script transformation instructions, and/or the optimization transformation instructions. Flow moves from operation 1015 to operation 1020.

At operation 1020, the response module 170 applies the list of transformation instructions, in order, to the identified portion(s) of the response 184. For example, for each transformation instruction, the response module 170 scans through the response 184 and performs the appropriate manipulations to the response 184.

In one embodiment, for each transformation instruction, the response module 170 performs the additional step to determine whether that transformation instruction is applicable for the requesting computing device. For example, as previously described, the response module 170 may apply certain transformation instructions only for certain User-Agents. Thus the response module 170 may examine the User-Agent of the requesting computing device to determine whether a particular transformation instruction should be applied. If a particular transformation instruction is not applicable for the requesting User-Agent, that transformation instruction will not be applied. As another example, the response module 170 may also determine whether a transformation instruction is applicable based on a cookie included in the request.

After each of the transformation instructions have been processed, flow moves to operation 1025 where the response module 170 renders the modified response and causes it to be transmitted to the Internet client 110. The portion(s) of the response which have not been transformed (e.g., they did not match the rules for any transformation instructions) are included in the rendered response. Thus, unlike mobile conversion techniques that require the use of custom templates and custom extraction code to transform the content, in embodiments of the invention element(s) that do not match a transformation instruction are included in the rendered response (in the case of a custom template technique, elements that are not extracted and put in a template are not included in the response).

Figures 11, 12, 13:
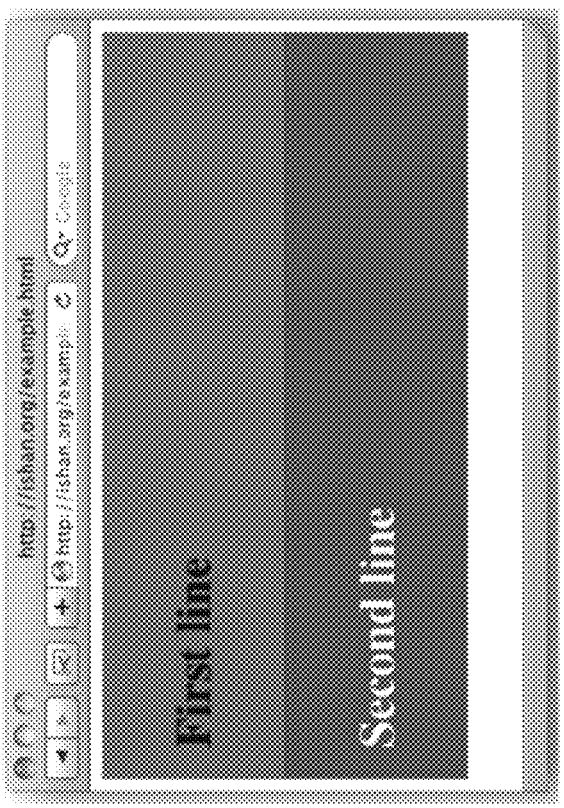
FIG. 11 illustrates an exemplary HTML document.
FIG. 12 illustrates an exemplary CSS document referred in the HTML document illustrated in FIG. 11.
FIG. 13 illustrates an exemplary rendered page of the HTML document illustrated in FIG. 11.

The following FIGS. 11-24 describe exemplary transformation instructions that may be applied. For the purpose of the following exemplary transformation instructions, the exemplary file is example.html (located at http://ishan.org/example.html) and its contents are shown in FIG. 11. Example.html includes a reference to a CSS file example.css, whose contents are shown in FIG. 12. FIG. 13 illustrates the rendered view of the HTML page prior to any transformation instructions being applied.

The RemoveElements transformation instruction removes one or more elements from the HTML document. The RemoveElements transformation instruction is an example of a type of visual formatting transformation instruction. The RemoveElements transformation instruction includes an argument, which is typically supplied by an operator during configuration (e.g., through the transformation instruction configuration panel 830), which indicates which HTML element(s) is/are to be removed. By way of example, the RemoveElements transformation instruction has been configured to remove the "beta" div from example.html.

Figures 14, 15:
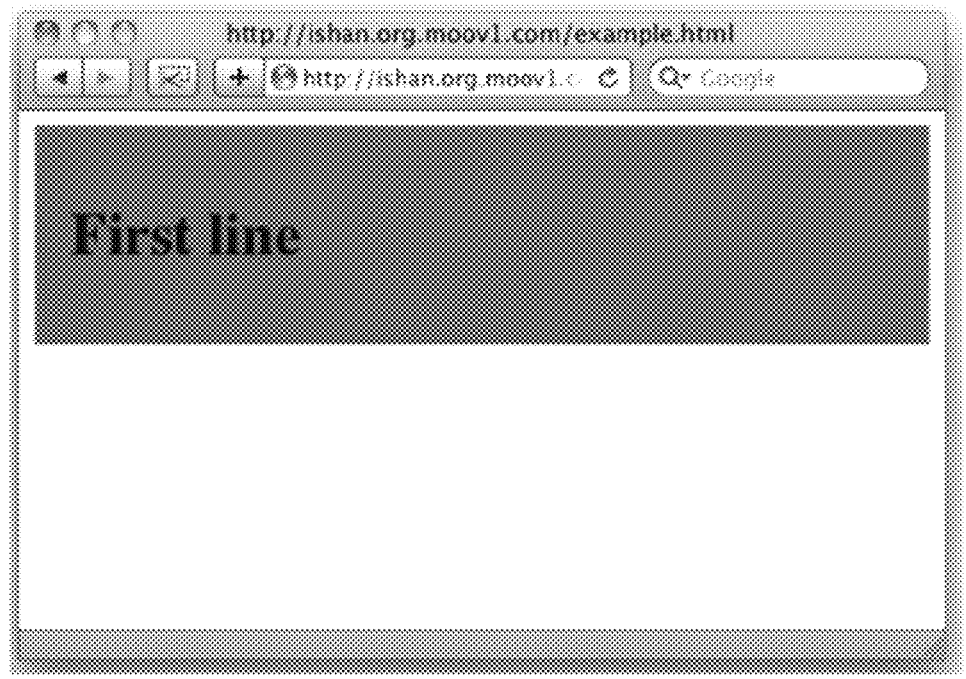
FIG. 14 illustrates the exemplary HTML document illustrated in FIG. 11 after a RemoveElements transformation instruction has been applied according to one embodiment.
FIG. 15 illustrates the rendered view of the HTML document illustrated in FIG. 14.

In order to apply the RemoveElements transformation instruction, the response module 170 is passed a current representation of the HTML document example.html. The current representation of the HTML document includes the result of previous transformations applied to the HTML document. The response module 170 scans through the current representation of the HTML document to locate the HTML element(s) that are to be removed from the HTML document. In one embodiment the response module 170 uses a parser that can search documents via XPath (XML Path Language) or CSS selectors. In one embodiment, if a matching HTML element is not found, an error message is reported to the system (an error message will not be displayed to the end user). If a matching element is found, the response module 170 modifies the HTML page by removing that element from the HTML. FIG. 14 illustrates the example.html source after the RemoveElements transformation instruction has been applied. As illustrated in FIG. 14, the "beta" div has been removed from the example.html document. FIG. 15 illustrates the rendered view of the HTML page after the RemoveElements transformation instruction has been applied.

As another specific example of a transformation instruction, the MoveBefore transformation instruction moves an element to a new position in the document that is directly before another element in the document. The MoveBefore transformation instruction is a type of visual formatting transformation instruction. The MoveBefore transformation instruction takes at least two parameters, which are typically supplied by an operator during configuration (e.g., through the transformation instruction configuration panel 830). One parameter indicates the HTML element that is to be moved (the "move-me" element) and the other parameter indicates the HTML element that the move-me element will be placed directly before the document (the "before-me" element). By way of example, the MoveBefore transformation instruction has been configured to move the "beta" div before the "alpha" div in the example.html illustrated in FIG. 11.

Figures 16, 17:
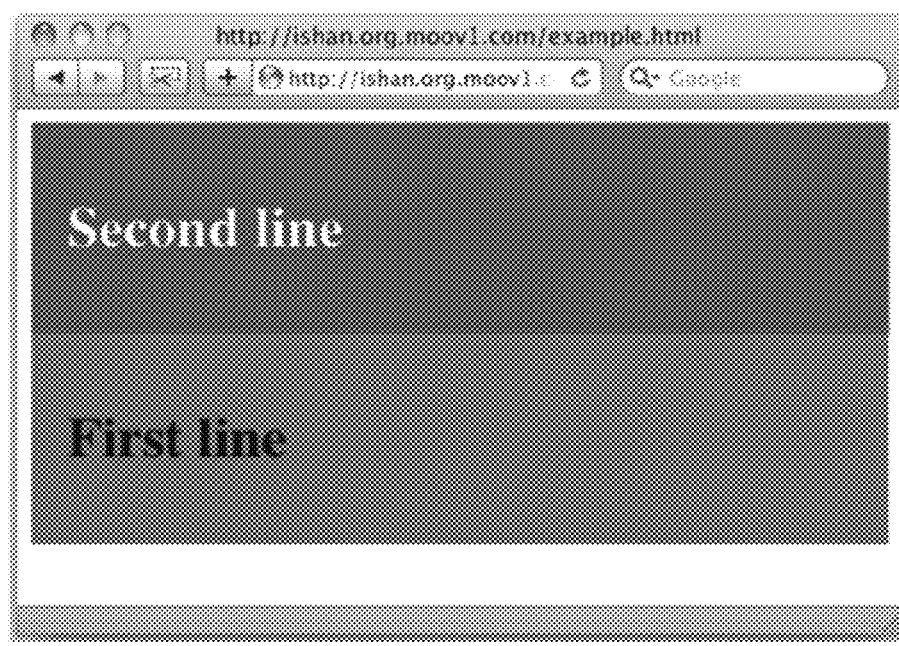
FIG. 16 illustrates the exemplary HTML document illustrated in FIG. 11 after the MoveBefore transformation instruction has been applied according to one embodiment.
FIG. 17 illustrates the rendered view of the HTML document illustrated in FIG. 17.

In order to apply the MoveBefore transformation instruction, the response module 170 is passed a current representation of the HTML document example.html. The response module 170 scans through the current representation of the HTML document to locate the HTML element that corresponds to the move-me element and locate the HTML element that corresponds to the before-me element. In one embodiment, if matching HTML element(s) are not found, an error message is reported to the system (an error message will not be displayed to the end user). If the move-me element and before-me element are located, the response module 170 modifies the HTML page by inserting the move-me element directly before the before-me element and removing the move-me element from its original position. With reference to a DOM (Document Object Model) representation of the HTML document, the move-me element will be inserted as a sibling of the before-me element but it will be inserted so that it is just before the before-me element in a list of before-me siblings. FIG. 16 illustrates the example.html source after the MoveBefore transformation instruction has been applied. As illustrated in FIG. 16, the "beta" div element has been moved directly before the "alpha" div element. FIG. 17 illustrates the rendered view of the HTML page after the MoveBefore transformation instruction has been applied.

It should be understood that other types of transformation instructions can be configured to move content from its original location in the response to another location, or move one or more attributes from an element to another element. For example, a MoveAfter transformation instruction moves a first element (typically specified by the operator) directly after a second element (also typically specified by the operator). As another example, a MoveAttributeToParent transformation instruction moves an attribute (e.g., the value of an "onclick") (typically specified by the operator) from a child element to its parent element. As another example, a MoveToBeginningOf transformation instruction moves an element (typically specified by the operator) to the first child of another element (also typically specified by the operator). As another example, a MoveToEndOf transformation instruction moves an element (typically specified by the operator) to the last child of another element (also typically specified by the operator).

Figures 18, 19:
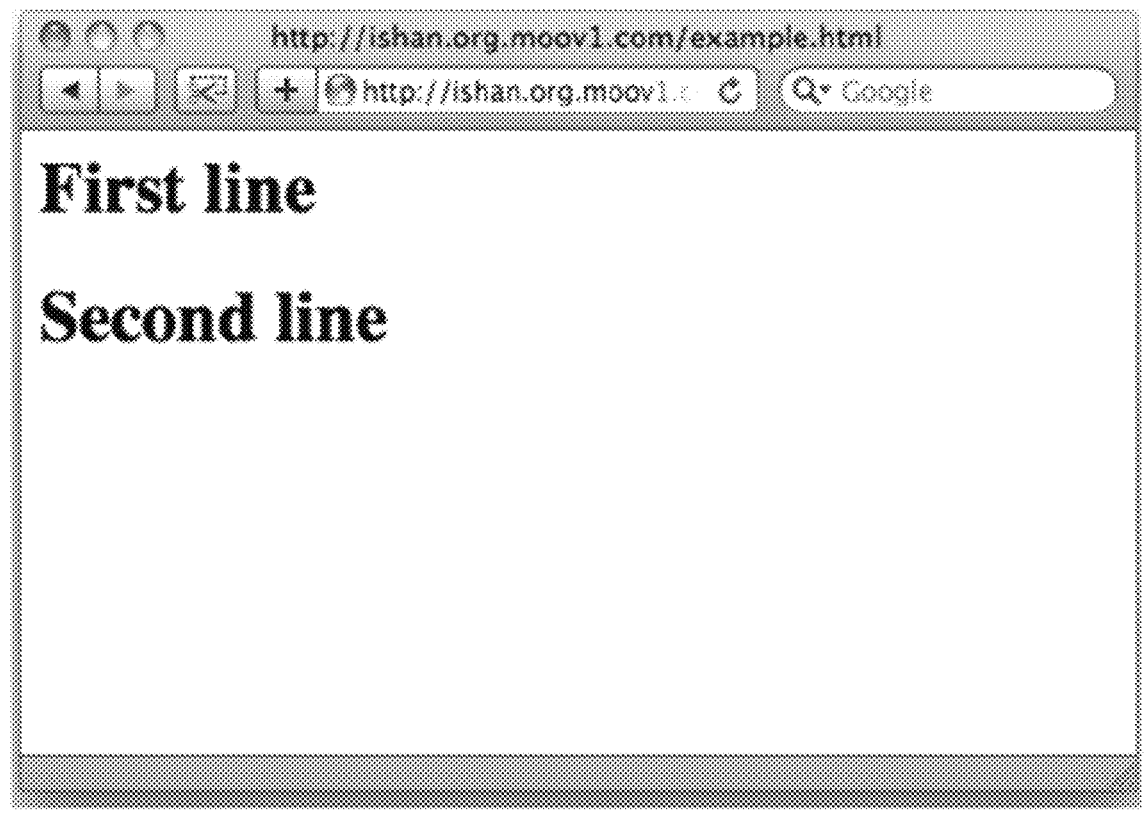
FIG. 18 illustrates the exemplary HTML document illustrated in FIG. 11 after a RemoveCSS transformation instruction has been applied according to one embodiment.
FIG. 19 illustrates the rendered view of the HTML document illustrated in FIG. 18.

As another specific example of a transformation instruction, the RemoveCSS transformation instruction removes all CSS styling from an HTML document. The RemoveCSS transformation instruction is a type of CSS transformation instruction. The RemoveCSS instruction does not take any parameters. The response module 170 scans through the current representation of the HTML document to locate any CSS styling in the document. For example, the response module 170 finds all <STYLE> elements, and <LINK> elements that have a "rel" attribute set to "stylesheet" (which indicates that it is an external CSS stylesheet). The response module 170 removes each of these elements from the HTML source code. FIG. 18 illustrates the example.html document after the RemoveCSS transformation instruction has been applied. As illustrated in FIG. 18, the <LINK> element has been removed from the document. FIG. 19 illustrates the rendered view of the example.html document after the RemoveCSS transformation instruction has been applied.

As another specific example of a transformation instruction, the AddCSS transformation instruction adds CSS styling to an HTML document. The AddCSS transformation instruction is a type of CSS transformation instruction. The AddCSS transformation instruction takes a parameter to indicate the URL of a file that contains the CSS styling to add. By way of example, the URL of the file that contains the CSS styling is located at http://ishan.org/alternate_example.css, and whose content is illustrated in FIG. 20. Typically the AddCSS transformation instruction is applied after the RemoveCSS transformation instruction has been applied and removed the original CSS styling from the HTML document. For example, the CSS file that is added may be designed specifically for mobile viewing.

In order to apply the AddCSS transformation instruction to the HTML document example.html, the response module 170 is passed a current representation of that document and creates a new <LINK> element and sets the "rel" attribute to "stylesheet", sets the "type" attribute to "text/css", and sets the "href" attribute to the value of the URL that contains the CSS styling to be added. The created <LINK> element is inserted at the end of the document's <HEAD> element. This example assumes that the original CSS styling (illustrated in FIG. 12) has been removed (e.g., by the RemoveCSS transformation instruction). FIG. 21 illustrates the example.html document source after the AddCSS transformation instruction has been applied. FIG. 22 illustrates the rendered view of the HTML page after the AddCSS transformation instruction has been applied.

As another specific example of a transformation instruction, the InlineCSS transformation instruction inserts the content of an external CSS file directly into an HTML document. The InlineCSS transformation instruction is a type of optimization transformation instruction. By moving the CSS inline, the total number of requests the Internet client has to make is reduced and potentially causes the page to load quicker. The InlineCSS transformation instruction takes one parameter that indicates the <LINK> element that will be inlined (the parameter is either a CSS or XPATH selector for the <LINK> element). By way of example, the InlineCSS transformation instruction has been configured to insert the content of the external CSS file illustrated in FIG. 12 into the example.html document.

In order to apply the InlineCSS transformation instruction to the example.html document, the response module 170 is passed a current representation of the document and locates all <LINK> elements that match the selector parameter configured by the operator, contain a valid "href" attribute, and either have no "rel" attribute or have a "rel" attribute with the value "stylesheet". For each of these elements, the external CSS file is downloaded. For those external CSS files that are downloaded successfully, the response module 170 inserts a new <STYLE> element into the <HEAD> of the document, which contains the downloaded CSS file. The original <LINK> element is removed. With respect to the example.html document illustrated in FIG. 11, the CSS style example.css (illustrated in FIG. 12) is downloaded and the code is inserted into the example.html document. FIG. 23 illustrates the example.html document source after the InlineCSS transformation has been applied. FIG. 24 illustrates the rendered view of the HTML page after the InlineCSS transformation has been applied.

Transformation instructions may also add features that are not otherwise found in the response (e.g., location features (e.g., maps, etc.), HTML5 features (e.g., local storage on the computing device), sharing features (e.g., social networking, blogging, microblogging, etc.), features for optimal mobile web viewing, etc.). As a specific example, the Accordion transformation instruction adds CSS to hide content of an HTML document behind its associated header, and adds a client-side script to reveal the content when the associated header is selected by a user. This can improve the readability and usability of the website on a mobile device that has a relatively smaller screen size than other computing devices. For example, after the Accordion transformation instruction is applied, users can scroll the entire page more quickly and reveal only the content in which they are interested in. The Accordion transformation instruction takes two parameters, which may be configured by the operator using the transformation instruction configuration panel 830. One parameter indicates the HTML element(s) that will be hidden (referred as the "content-selector"), which will be revealed when a user selects the associated element. One parameter indicates the HTML element(s) that will be made selectable to reveal the associated hidden elements (referred as the "link-selector"). In one embodiment, the link-selector and the content-selector are both CSS selectors, and have a one to one relationship (i.e., there is a single link-selector associated with a single content-selector).

To apply the Accordion transformation instruction, the response module 170 finds all the HTML elements referenced by the link-selector (referred to as "link-elements") and finds all the HTML elements referenced by the content-selector (referred to as "content-elements). The response module 170 hides the content-elements by adding a "style='display:none'" attribute to these elements. The response module 170 associates the first link-element with the first content-element, associates the second link-element with the second content-element, and so on. The response module 170 also adds an "onclick" attribute to each link-element that references an added client-side script that toggles the display of the associated content-element (e.g., by toggling between "style='display:none'" and "style='display:block'").

FIG. 25 illustrates an exemplary HTML document source where the Accordion transformation instruction will be applied. The exemplary HTML document source illustrated in FIG. 25 includes the link-elements 2520 and 2530, and the content-elements 2525 and 2535. FIG. 26 illustrates the exemplary HTML document source illustrated in FIG. 25 rendered (prior to the Accordion transformation instruction being applied). In order to apply the Accordion transformation instruction to the exemplary HTML document illustrated in FIG. 25, the response module 170 locates all the link-elements (link-elements 2520 and 2530) and the content-elements (content-elements 2525 and 2530), adds a "style='display:none'" attribute to the content elements, and adds an "onclick" attribute to the link-elements 2520 and 2530 that references an added client-side script that, when selected by the user, toggles the display of the content-elements 2525 and 2535 respectively.

Figure 28:
FIG. 28 illustrates a rendered view of the HTML document illustrated in FIG. 25 after the Accordion transformation is applied according to one embodiment.
Figure 29:
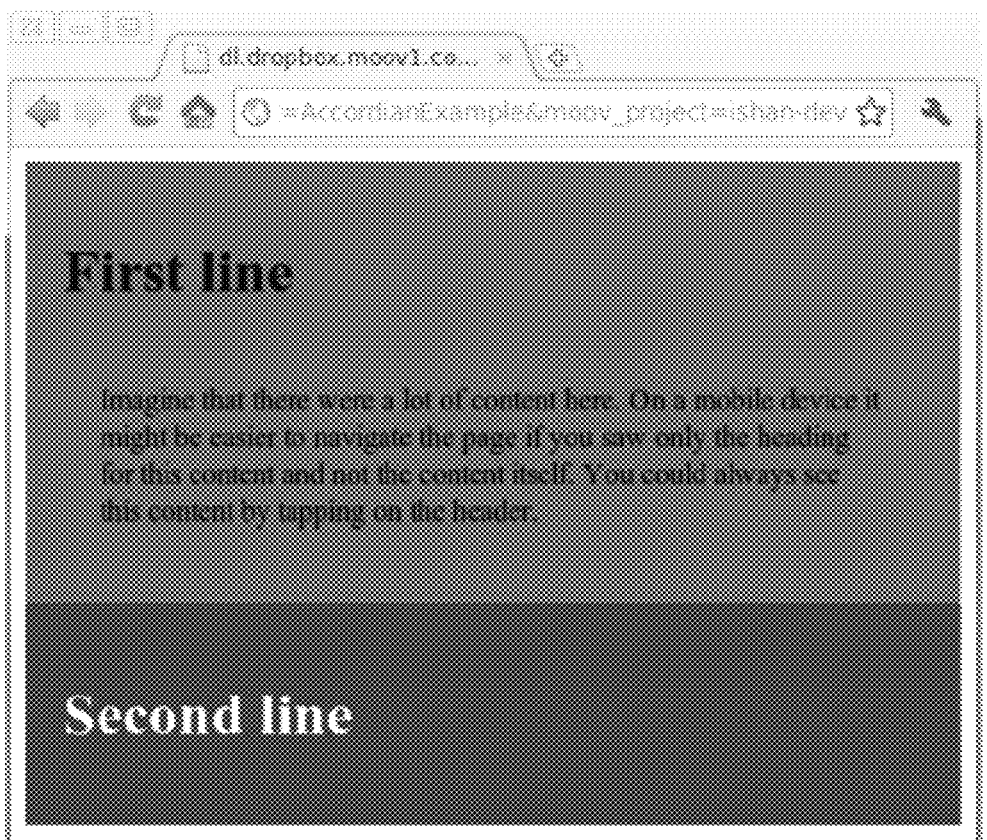
FIG. 29 illustrates a rendered view of the HTML document of FIG. 25 after the Accordion transformation is applied and after a user has selected one of the headers according to one embodiment.

FIGS. 27A-B illustrate the exemplary HTML document source after the Accordion transformation is applied. In particular, FIG. 27A includes JavaScript to effect the toggling nature of the accordion construct. As illustrated in FIG. 27B, the link-elements 2520 and 2530 have been modified to include an "onclick" attribute that refers to the JavaScript illustrated in FIG. 27A, and the content-elements 2525 and 2535 have been modified with the addition of a "style='display:none'" attribute. FIG. 28 illustrates a rendered view of the HTML document after the Accordion transformation is applied. The headers "First line" and "Second line" are concealing content. When selected, they will reveal the concealed content. For example, FIG. 29 illustrates a rendered view of the HTML document after the Accordion transformation is applied and after a user has selected the header "First line," which causes the hidden content to be revealed.

With reference back to the exemplary transformation instruction editor 190, it also includes the ability for the operator to cache the resource while configuring the transformation instructions for that resource. Thus instead of working on the live version of a resource such as a web page (which may include downloading the resource multiple times when testing the configuration), the resource is downloaded once from the origin server while being configured. For example, the Toggle Freeze Proxy 850 allows the operator to toggle between working on a cached version of the resource and a live version of the resource. The Clear Freeze Proxy Cache 855 allows the operator to clear the cached version thereby causing the resource to be downloaded anew on the next request.

In one embodiment, on each response that is dynamically modified, the dynamic web content transformation server 120 writes a report describing how long the transformation took on each transformation instruction and whether any errors have occurred. In one embodiment, the reports are generated and stored in the report database 195. In some embodiments the reports are emailed or otherwise available to the operator of the dynamic web content transformation server 120. For example, the reports are available for viewing using the report tab 860 of the transformation instruction editor 190.

After the transformation instructions are configured for a given resource or group of resources, the automatic and dynamic determination and application of transformation instructions to modify web responses reduces the complexity of configuration and maintenance that is associated with other techniques that involve the use of custom templates in order to format a mobile page. For example, in contrast with a custom-template technique, if a new feature is added to a non-mobile page, that feature will appear on the mobile version of the page even if there is not a transformation instruction that is configured for the new feature (often a transformation instruction will already be configured and apply to the new feature). Thus, using embodiments of the invention, an operator or website administrator/developer does not need to take time to create additional custom templates and custom extraction code each time a feature is added in order for that feature to appear on the mobile version of the page.

In addition, since the underlying code for the transformation instructions is predefined, the transformation instruction editor 190 can be used by designers or other people that are not software programmers or highly technical personnel. Thus, changes in determining which transformation instructions are to apply to which domains, subdomains, and/or paths can be quickly implemented both by website designers or other people that are not technical personnel or familiar with software programming.

In addition, unlike automatic mobile conversion techniques that remove all client-side scripts and do not support cookies, the dynamic rehosting mobile conversion technique described herein supports client-slide scripts (if supported by the requesting computing device) and supports the use of cookies. Thus, using embodiments of the invention described herein, the mobile version of a website functions in a similar way as the non-mobile version.

While specific examples of transformation instructions have been described herein, it should be understood that these are not meant to be limiting as there are many other transformation instructions that may be applied to convert a resource of one type suitable for viewing/use on a class of device (e.g., a non-mobile resource for viewing/use on a device such as a desktop or laptop) into a form suitable for viewing/use on a different class of device (e.g., into a form suitable for viewing/use on a mobile browser of a computing device, into a form suitable for viewing/use on a set-top box, kiosk, or other class of computing device that has different user interface characteristics and/or device capabilities than the resource was originally designed for).

In some embodiments the dynamic web content transformation server 120 can request multiple web pages from multiple hosts and cause them to be displayed side-by-side in the same page on the same domain (e.g., without using iframes). This may allow the creation of an aggregation of related content from multiple sources. For example, an aggregated content page can include a map of houses for sale from a real estate website on the same page as a map and/or listing of criminal incidents for the same region from a local law enforcement website.

In addition, in some embodiments, the dynamic web content transformation server 120 can provide an API (e.g., SOAP (Simple Object Access Protocol), REST (Representational State Transfer), or other Internet API) based on the data that is pulled from web pages and/or websites. This allows certain websites to be read and used by devices and application interfaces that do not include a web browser or are not a web browser. For example, on some smartphones there is a default search interface (which by itself is not a browser). By using the API, an operator can configure page requests received from the default search interface application to submit the search word to a website (e.g., if searching for a definition, the word can be transmitted to an online dictionary), receive and extract the results from the search and return them back to the application (e.g., in XML format) to be displayed to the user.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more computing devices (e.g., a mobile computing device, a dynamic web content transformation server, etc.). Such computing devices store and communicate (internally and/or with other computing devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such computing devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given computing device typically stores code and/or data for execution on the set of one or more processors of that computing device. Of course, one or more parts of an embodiment of the invention may be implemented using different combinations of software, firmware, and/or hardware.

While embodiments have been described herein as performing dynamic web content transformation on behalf of website(s) at a server that is not owned or directly controlled by those website(s), embodiments are not so limited. For example, in some embodiments the dynamic web content transformation for resources of a domain, subdomain, and/or path is performed on a server that is directly associated with that domain, subdomain, and/or path. For example, in one embodiment an origin server is configured to perform dynamic web content transformation for some of its resources depending on whether the incoming request has been sent from a mobile device.

Figure 30:
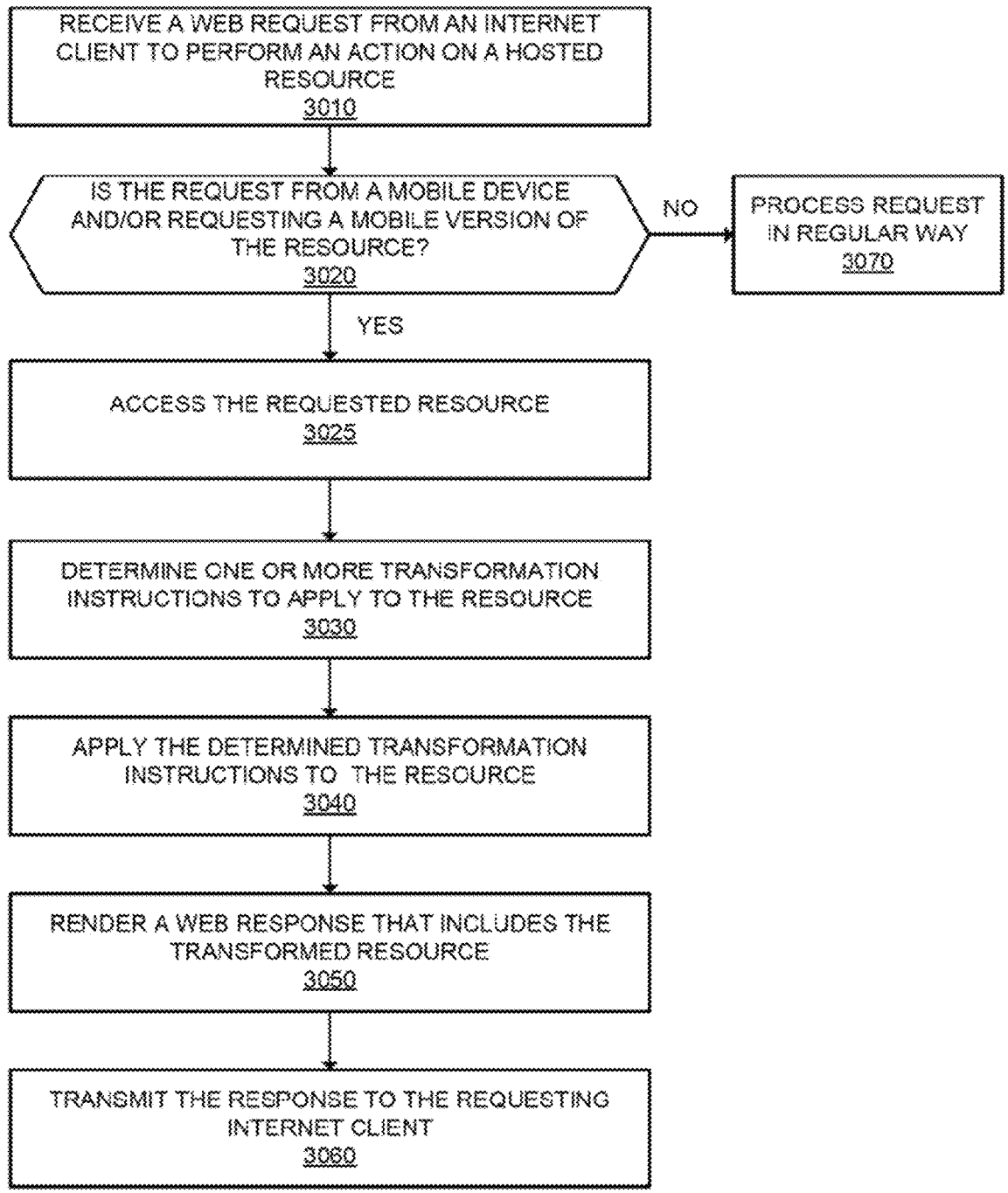
FIG. 30 is a flow diagram that illustrates exemplary operations performed on an origin server for dynamically transforming web content according to one embodiment.

FIG. 30 is a flow diagram that illustrates exemplary operations performed on an origin server for dynamically transforming web content according to one embodiment. At operation 3010, the origin server receives a request from an Internet client to perform an action on a hosted resource (a resource that is local to the origin server). For example, the origin server receives an HTTP request or a web page that is hosted by the origin server. Flow moves from operation 3010 to operation 3020.

At operation 3020, the origin server determines whether the request is from a mobile device (e.g., a smartphone, a PDA, a portable media player, a GPS device, a gaming device, etc.) and/or is requesting a mobile version of the resource. The origin server may determine that the request is for a mobile version based on the URL of the resource. For example, the website associated with the origin server may use a particular naming convention for mobile versions of its pages (e.g., http://m.example.com may refer to the mobile version of http://example.com) such that if the request matches that naming convention, the request is for a mobile version of the resource. The origin server may also determine that the request is for a mobile version (or from a mobile device) based on the User-Agent of the requesting Internet client (the User-Agent may identify that the requesting computing device is a mobile device and/or using a mobile-browser). As another example, the origin server may also determine that the request is for a mobile version (or from a mobile device) based on the value of a cookie being sent by the requesting computing device. If the request is from a mobile device and/or is requesting a mobile version of the resource, flow moves to operation 3025; otherwise flow moves to 3070 where the request is processed in a regular way for non-mobile devices and/or non-mobile Internet clients.

At operation 3025, the origin server accesses the requested resource, and flow moves to operation 3030. Since the requested resource is hosted by the origin server, it can typically access the requested resource without making an external request. At operation 3030, the origin server determines one or more transformation instructions to apply to identified portion(s) of the resource. For example, the origin server compares the URL of the resource against a list of URL mappings to determine which transformation instruction(s) are applicable for the resource. The one or more transformation instructions may include one or more of the rehosting transformation instructions, the CSS transformation instructions, the visual formatting transformation instructions, the client-side script transformation instructions, and/or the optimization transformation instructions that are described herein. In one embodiment these transformation instructions are configured by an operator of the origin server using a transformation instruction editor such as the editor 190 described herein.

Flow then moves to operation 3040 and the origin server applies the determined transformation instructions to identified portion(s) of the resource (in a similar way as previously described herein). Flow then moves to operation 3050 and the origin server renders a web response (e.g., an HTTP response) that includes the resource as it has been transformed by application of the transformation instructions. The portion(s) of the resource which have not been transformed are also included in the response. Flow then moves to operation 3060 and the response is transmitted to the requesting Internet client.

In one embodiment, the origin server may cache the mobile version of the requested resource (which will include any transformations necessary). In such an embodiment and if there is a cached mobile version, the origin server accesses the cached version (assuming that it is still fresh) and returns that cached version to the requesting computing device (thereby bypassing any additional transformation operations).

Figure 31:
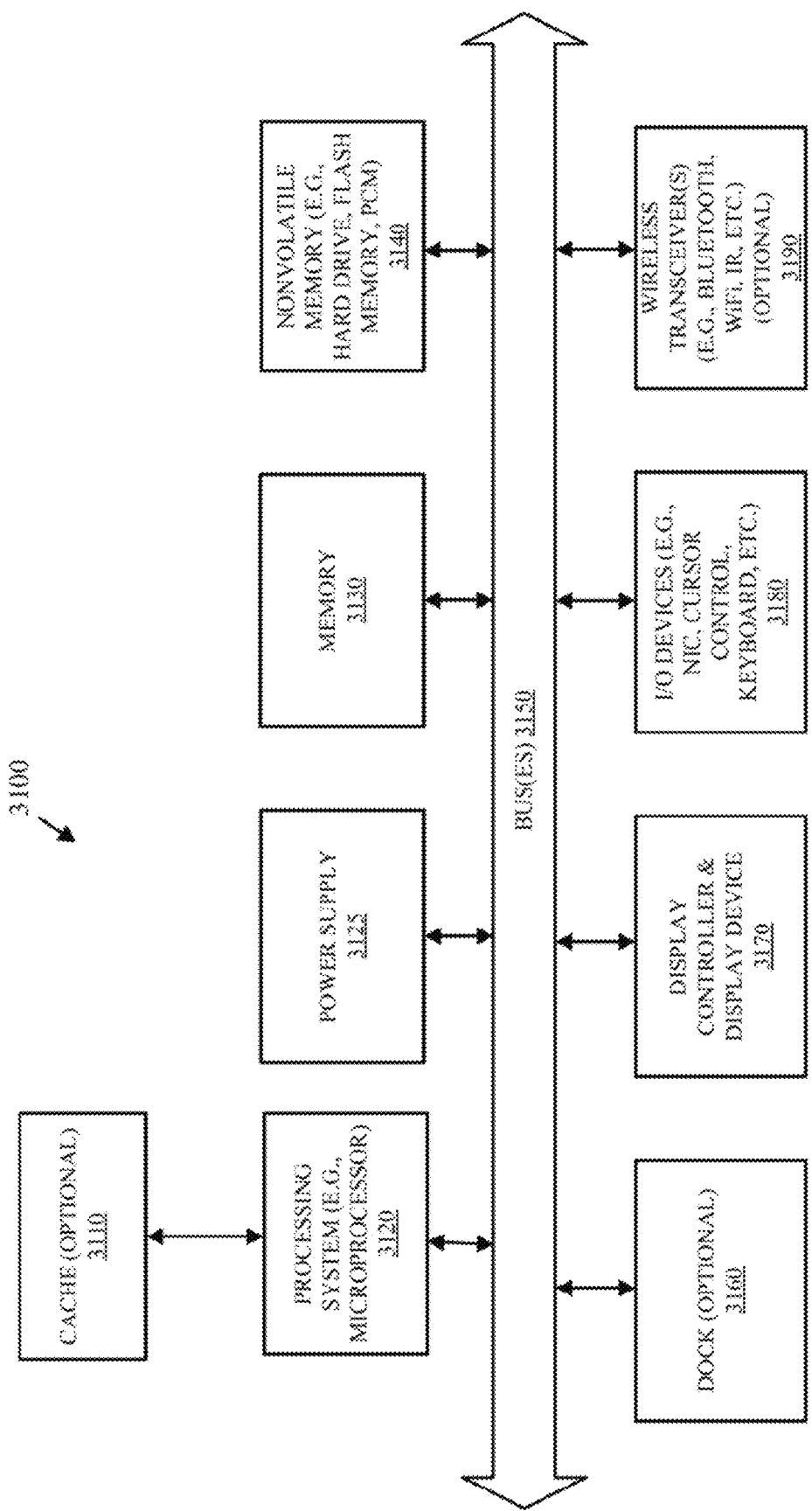
FIG. 31 is a block diagram illustrating an exemplary computer system which may be used in some embodiments.

FIG. 31 is a block diagram illustrating an exemplary computer system which may be used in some embodiments. For example, the exemplary architecture of the computer system 3100 may be included in the computing device 105, the dynamic web content transformation server 120, the origin server 130, and/or other computing devices described herein. It should be understood that while FIG. 31 illustrates various components of a computer system, it is not intended to represent any particular architecture or manner of interconnecting the components as such details are not germane to the present invention. It will be appreciated that other computer systems that have fewer components or more components may also be used.

As illustrated in FIG. 31, the computer system 3100, which is a form of a data processing system, includes the bus(es) 3150 which is coupled with the processing system 3120, power supply 3125, memory 3130, and the nonvolatile memory 3140 (e.g., a hard drive, flash memory, Phase-Change Memory (PCM), etc.). The bus(es) 3150 may be connected to each other through various bridges, controllers, and/or adapters as is well known in the art. The processing system 3120 may retrieve instruction(s) from the memory 3130 and/or the nonvolatile memory 3140, and execute the instructions to perform operations as described herein (e.g., apply the transformation instructions described herein). The bus 3150 interconnects the above components together and also interconnects those components to the optional dock 3160, the optional display controller & display device 3170, Input/Output devices 3180 (e.g., NIC (Network Interface Card), a cursor control (e.g., mouse, touchscreen, touchpad, etc.), a keyboard, etc.), and the optional wireless transceiver(s) 3190 (e.g., Bluetooth, WiFi, Infrared, etc.).

While some embodiments have been described with reference to transforming a non-mobile page to a mobile page suitable for a mobile device, the techniques described herein are applicable to other types of transformation from one format to another format. For example, using the transformation instructions described herein, original web content can be dynamically transformed based on the requirements of the requesting computing device and/or Internet client, or based on a custom preference of either the original web content provider or the user of the requesting computing device.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of operating an intermediary server to provide web content to clients, the method comprising:
manipulating, with the intermediary server, web content to reduce a loading time of the web content at a client, wherein the manipulating comprises:
receiving, with the intermediary server, a request from the client for first web content of the web content;
obtaining, with the intermediary server, the first web content of the web content from a server hosting the first web content, the first web content comprising first instructions;
editing, with the intermediary server, the first web content to generate edited first web content, wherein the editing the first web content comprises the intermediary server transforming at least one instruction of the first instructions in the first web content to generate second instructions that, when processed by the client, reduce the loading time of the web content at the client as compared to the first instructions; and
providing the edited first web content from the intermediary server to the client as a response to the request,
wherein transforming the at least one instruction of the first instructions in the first web content comprises:

generating the second instructions that, when processed by the client, cause the client to perform:
identifying a first link in the first web content indicating second web content of the web content,
obtaining at least some of the second web content,
loading the at least some of the second web content, and
in response to a user activating the first link to the second web content, displaying to the user the at least some of the second web content previously obtained and loaded.

2. The method of claim 1, wherein the second instructions cause the client to obtain the at least some of the second web content without receiving a request from a user for the second web content.

3. The method of claim 1, wherein the second instructions cause the client to identify, from among a plurality of links to other web content included within the first web content, a subset of links each indicating further web content of the web content, and to perform the obtaining and loading for each further web content indicated by each link of the subset of links.

4. The method of claim 3, wherein the second instructions cause the client to identify the subset of links, of the plurality of links included within the first web content, by identifying links the user is likely to select.

5. The method of claim 1, wherein the second web content comprises an HTML page.

6. At least one non-transitory computer-readable storage medium having encoded thereon executable instructions that, when executed by at least one processor, cause the at least one processor to carry out a method of operating an intermediary server to provide web content to clients, the method comprising:
manipulating, with the intermediary server, web content to reduce a loading time of the web content at a client, wherein the manipulating comprises:
receiving, with the intermediary server, a request from the client for first web content of the web content;
obtaining, with the intermediary server, the first web content of the web content from a server hosting the first web content, the first web content comprising first instructions;
editing, with the intermediary server, the first web content to generate edited first web content, wherein the editing the first web content comprises the intermediary server transforming at least one instruction of the first instructions in the first web content to generate second instructions that, when processed by the client, reduce the loading time of the web content at the client as compared to the first instructions; and
providing the edited first web content from the intermediary server to the client as a response to the request,
wherein:
editing the first web content further comprises removing some web content of the first web content; and
the second instructions, when processed by the client, cause the client to obtain and load the some web content following loading of the first web content.

7. The at least one non-transitory computer-readable storage medium of claim 6, wherein the second instructions that cause the client to obtain and load the some web content following loading of the first web content further cause the client to obtain and load the some web content in response to completing loading of the edited first web content.

8. The at least one non-transitory computer-readable storage medium of claim 6, wherein the second instructions that cause the client to obtain and load the some web content following loading of the first web content further cause the client to obtain and load the some web content in response to the client being operated to display a portion of the first web content that corresponds to the some web content that was removed.

9. The at least one non-transitory computer-readable storage medium of claim 6, wherein:
the first web content comprises an HTML document including a link to a separate web content file;
editing the first web content comprises removing from the HTML document the link to the separate web content file; and
editing the first web content comprises injecting into the HTML document at least some instructions included within the separate web content file.

10. The at least one non-transitory computer-readable storage medium of claim 9, wherein:
the separate web content file comprises formatting instructions to affect display on the client of content described in the HTML document; and
injecting into the HTML document the at least some instructions included within the separate web content file comprises injecting the formatting instructions into the HTML document.

11. The at least one non-transitory computer-readable storage medium of claim 9, wherein:
the separate web content file comprises script instructions for execution by the client; and
injecting into the HTML document the at least some instructions included within the separate web content file comprises injecting at least some of the script instructions into the HTML document.

12. An apparatus comprising:
at least one processor; and
at least one computer-readable storage medium having encoded thereon executable instructions that, when executed by the at least one processor, cause the at least one processor to carry out a method of operating an intermediary server to provide web content to clients, the method comprising:
manipulating, with the intermediary server, web content to reduce a loading time of the web content at a client, wherein the manipulating comprises:
receiving, with the intermediary server, a request from the client for first web content of the web content;
obtaining, with the intermediary server, the first web content of the web content from a server hosting the first web content, the first web content comprising first instructions;
editing, with the intermediary server, the first web content to generate edited first web content, wherein the editing the first web content comprises the intermediary server transforming at least one instruction of the first instructions in the first web content to generate second instructions that, when processed by the client, reduce the loading time of the web content at the client as compared to the first instructions; and
providing the edited first web content from the intermediary server to the client as a response to the request, wherein:
the first web content comprises an HTML document; and
editing the first web content comprises removing at least one of the first instructions from the HTML document.

13. The apparatus of claim 12, wherein removing at least one of the first instructions from the HTML document comprises removing an attribute from an element of the HTML document.

14. The apparatus of claim 12, wherein editing the first web content comprises injecting at least one of the second instructions into a different part of the HTML document from which the at least one of the first instructions was removed.

15. The apparatus of claim 12, wherein editing the first web content comprises injecting at least one of the second instructions describing an object that, when displayed by the client, obscures display of other content of the first web content.

16. The apparatus of claim 12, wherein:
the first web content comprises a first file having a first file size; and
transforming the at least one instruction of the first instructions comprises replacing a reference to the first file with a reference to a second file having a second file size, the second file size being less than the first file size.

\* \* \* \* \*